(12) United States Patent
Imamichi et al.

(10) Patent No.: US 9,043,660 B2
(45) Date of Patent: May 26, 2015

(54) DATA STORE CAPABLE OF EFFICIENT STORING OF KEYS

(71) Applicant: International Business Machines Corporation, Armonk, NY (US)

(72) Inventors: Takashi Imamichi, Kawasaki (JP); Teruo Koyanagi, Tokyo (JP); Raymond H. P. Rudy, Yokohama (JP); Yuya Unno, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 13/661,862

(22) Filed: Oct. 26, 2012

(65) Prior Publication Data
US 2014/0122921 A1    May 1, 2014

(30) Foreign Application Priority Data

Oct. 26, 2011 (JP) ................. 2011-234790

(51) Int. Cl.
*G06F 11/00* (2006.01)
*G06F 17/30* (2006.01)

(52) U.S. Cl.
CPC .... *G06F 17/30321* (2013.01); *G06F 17/30584* (2013.01)

(58) Field of Classification Search
CPC ......... G06F 12/00; G06F 17/30; G06F 3/067; G06F 17/30194; G06F 3/0685; G06F 17/30312; G06F 2211/103; G06F 17/30705; G06F 17/30864; G06F 3/0611; G06F 3/0689; G06F 17/2252; G06F 2212/7201
USPC .................................................. 714/6.2, 54
See application file for complete search history.

(56) References Cited

U.S. PATENT DOCUMENTS

| 7,457,800 B2 * | 11/2008 | Margolus et al. ..................... 1/1 |
| 8,380,758 B1 * | 2/2013 | Stephens ....................... 707/803 |

(Continued)

FOREIGN PATENT DOCUMENTS

| JP | 6149897 A | 5/1994 |
| JP | 6176070 A | 6/1994 |

(Continued)

OTHER PUBLICATIONS

Okanohara Daisuke "Effective Massive Key Storage Method tx bep", [online], the University of Tokyo, [Searched on Sep. 15, 2011], the Internet <URL:http://www-tsujii.is.s.u-tokyo.ac.jp/~hillbig/papers/2007-1032-massiveKeys.pdf>, 31 pages.

(Continued)

*Primary Examiner* — Bryce Bonzo
*Assistant Examiner* — Elmira Mehrmanesh
(74) *Attorney, Agent, or Firm* — Cantor Colburn LLP

(57) ABSTRACT

Embodiments relate to a computer implemented information processing system, method and program product for data access. The information processing system includes a data store having a top tier store and at least another tier store with the top tier store including a counter for each entry of a symbol and another tier store including a representative frequency value defined for the another tier store. A sorter is also provided configured to sort the symbol in the top tier store and the another tier stores according to a value generated in the counter for the assessed symbol. The said sorter is also configured to restore entry of the symbol in the top tier store, in response to a symbol having moved from said top tier store to another tier store, by using the representative frequency value defined for said another store to which said symbol was moved.

20 Claims, 17 Drawing Sheets

(56) References Cited

U.S. PATENT DOCUMENTS

| | | | |
|---|---|---|---|
| 8,386,717 B1* | 2/2013 | Banerjee et al. | 711/136 |
| 2006/0036627 A1* | 2/2006 | Deran | 707/100 |
| 2007/0112875 A1* | 5/2007 | Yagawa | 707/200 |
| 2008/0133574 A1* | 6/2008 | Fukushima et al. | 707/102 |
| 2008/0195595 A1* | 8/2008 | Masuyama et al. | 707/5 |
| 2010/0017397 A1* | 1/2010 | Koyanagi et al. | 707/5 |
| 2010/0274826 A1* | 10/2010 | Takata et al. | 707/812 |
| 2011/0072206 A1* | 3/2011 | Ross et al. | 711/108 |
| 2011/0107042 A1* | 5/2011 | Herron | 711/161 |
| 2012/0036317 A1* | 2/2012 | Torii | 711/108 |
| 2012/0317338 A1* | 12/2012 | Yi et al. | 711/103 |

FOREIGN PATENT DOCUMENTS

| | | | |
|---|---|---|---|
| JP | 830640 A | 2/1996 | |
| JP | 2000215201 A | 8/2000 | |
| JP | 2001014191 A | 1/2001 | |
| JP | 2005050197 A | 2/2005 | |
| JP | 2008134688 A | 6/2008 | |
| WO | 2010114006 A1 | 10/2010 | |
| WO | 2013061680 A1 | 5/2013 | |

OTHER PUBLICATIONS

X. Dimitropoulos, et al., "Probabilistic Lossy Counting: An efficient Algorithm for Finding Heavy Hitters", ACM SIGCOMM Computer Communication Review, vol. 38, Issue 1, Jan. 2008, 10 pages.

G. Jacobson, "Space-efficient Static Trees and Graphs" In Proceedings of the 30th Annual Symposium on Foundations of Computer Science (SFCS '89), IEEE Computer Society, USA, 1989, p. 549-554.

G. S. Manku, et al., "Approximate Frequency Counts over Data Streams", Proceedings of the 28th International Conference on Very Large Data Base (VLDB), 2002, 12 pages.

Q. Rong, et al., "Mnemonic Lossy Counting: An Efficient and Accurate Heavy-Hitters Identification Algorithm", Performance Computing and Communications Conference (IPCCC) 2010 IEEE 29th International, 2010, p. 255-262.

Notification Concerning Availability of the Publication of the International Application, PCT/JP2012/071448 filed Aug. 24, 2012, mailed May 2, 2013, 1 page.

International Search Report for PCT/JP2012/071448, filing date Aug. 24, 2012, mail notification date Nov. 20, 2012, 2 pages.

Written Opinion for PCT/JP2012/071448, filing date Aug. 24, 2012, mail notification date Nov. 20, 2012, 3 pages.

* cited by examiner (A)

(B)

(A)

(B)

(A)

(B)

US 9,043,660 B2

DATA STORE CAPABLE OF EFFICIENT STORING OF KEYS

PRIORITY

This application takes priority under the Japanese application number 2011-234790 filed Oct. 26, 2011, and all the benefits accruing therefrom under 35 U.S.C. §119, the contents of which are herein incorporated by reference in its entirety.

BACKGROUND

The present invention relates to a data store, and more specifically to an information processor configured to build a data store capable of efficiently storing keys.

A number of applications such as those relating to language processing and user management increasingly demand storing a large number of character strings such as words, phrases, persons' names, and URLs in a limited memory that requires high space efficiency. Having the ability to provide a highly efficient data store makes it possible to manage a large number of character strings in a limited memory in a space-saving manner to allow efficient implementation of the aforementioned applications.

Traditionally, a hash map or a hash table is used in connection with efficient data store and high efficiency usage. The hash map has a data structure in which keys are mapped to values by using hash functions. The hash map is capable of registering values by using keys such that such values are referenced by the corresponding key. Due to the ability of managing these "values" by using a hash map and retrieving it from corresponding keys, such hash maps can be built incrementally. Hash maps also enable high-speed access due to the fact that both search and addition features are done within a specified time limit regardless of the number of elements involved. One challenge, however, in using hash maps is to use sufficiently sparse tables such that the rate of hash collisions are reduced to enhance memory and space efficiency.

A trie also known as an ordered tree, is a data structure that is used to store an associative array where the keys are usually strings and often no node in the tree stores the key associated with that node; instead, its position in the tree defines the key with which it is associated. A trie implemented with a double-array is known as another data store for the aforementioned usage. The trie implemented with the double-array (hereinafter a double-array or a double-array trie) has a data structure in which the function of storing keys is maintained by using a link structure. The double-array is inferior to the hash map from a viewpoint of data access speed, but is known to achieve relatively high memory space efficiency. Therefore, electing between the two options provides a trade off at times.

BRIEF SUMMARY

A computer implemented information processing system, method and program product for data access is provided. According to one embodiment, the information processing system includes a data store having a top tier store and at least another tier store with the top tier store including a counter for each entry of a symbol and another tier store including a representative frequency value defined for the another tier store. A sorter is also provided to sort the symbol in the top tier store and the another tier stores according to a value generated in the counter for the assessed symbol. The sorter is also configured to restore entry of the symbol in the top tier store, in response to a symbol having moved from said top tier store to another tier store, by using the representative frequency value defined for said another store to which said symbol was moved.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
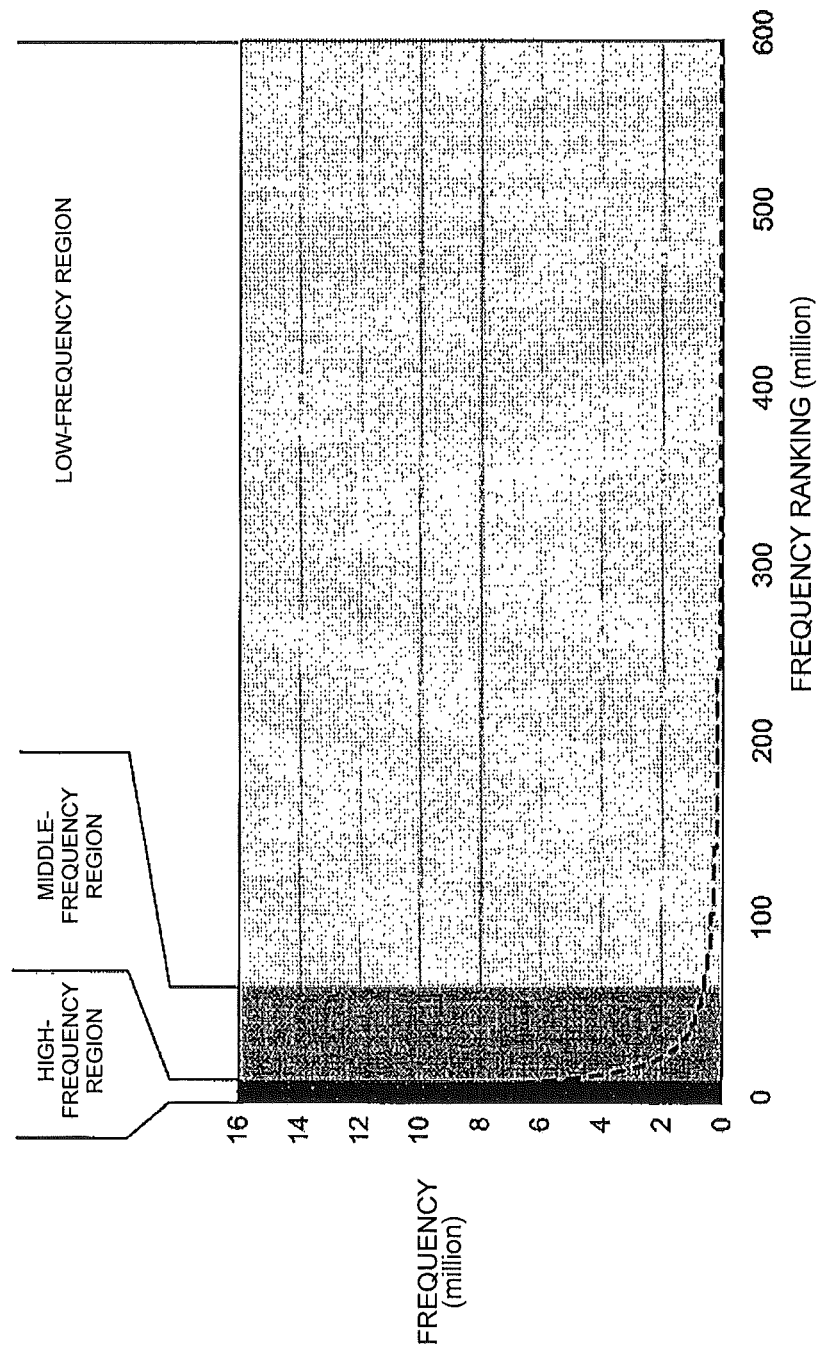
FIG. 1 is a graphical illustration showing relationship between the frequency of a keyword and the ranking of the frequency in accordance with one or more embodiments of the present invention.

As discussed previously using a hash map versus a double-array provides a tradeoff relationship between data access speed and high memory space efficiency. In one embodiment of the present invention an information processing system is provided with a data store operation that allows achieving high space efficiency for storing keys while providing high data access speed at the same time.

Stream algorithms enable efficient acquisition of sets of items used at high frequency (frequent items). For data usage in which data at low frequency is considered unimportant, such algorithms efficiently retain frequently used and relatively important data with a relatively small amount of memory consumption. On the other hand, the sets of items at low frequency not selected as the frequent items are discarded. This creates an issue because data usage required to retain all such entries creates a challenge. One example would be in instances where a key value store for a dictionary is used and another example involves applications geared towards user management of data.

In addition, a trie implemented with a level order unary (an operation with a single input or operand) asymptotically optimally, in a boolean array is termed as levelorder unary degree sequence data structures or LOUDS. Succinct data structures such as LOUDS differ from more traditional data structures, in part, because they avoid the use of indices and pointers. In comparison with the double-array implementation, use of LOUDS for representing a trie storing character strings such as words incurs high cost by several times in the viewpoint of the access speed but it is reported that it achieves high memory space efficiency by 4 to 10 times. Since LOUDS has a structure of data tightly arranged in the memory space, addition of a new character string to a once completed LOUDS requires generation of a gap (one bit for representing a node) at a position where the node of the new character string is to be added, and thus requires moving of half of the total data on average. For this reason, addition of a new character string in an already built data structure incurs considerable processing cost.

In addition, a strategy of preferentially retaining keys used at high frequency is known in the usage of processing an enormous amount of stream data. For example, a technique can be imagined by which the frequencies of items inputted as stream data are counted by using lossy counting method to acquire sets of items at higher frequencies. LOSSY is often used to a type of compression or data encoding method that selectively discards data in order to minimize the amount of data that needs to be held, handled, and/or transmitted by a computer to achieve more efficiency. Both probabilistic lossy counting methods and mnemonic lossy counting methods can be used to improve such efficiency.

To solve the tradeoff challenge indicated earlier, attention needs to be given to data inputted in a data store which can be used at higher and lower frequencies. An embodiment as will be presently discussed in more detail includes a top tier store which has a counter provided for each of entries of symbols and is a component of a data store. The information processing system also includes one or more tier stores which are components of the data store. The one or more tier stores each have a representative value which is representative of the frequencies of the symbols and defined for each tier. The information processing system further includes a sorter which counts an accessed symbol in the top tier store and sorts the symbol to any one of the top tier store and the one or more tier stores according to its counter value. In response to an access to a symbol having been moved from the top tier store, the sorter in the information processing system restores the entry of the symbol in the top tier store by using the representative value of the frequency defined for the tier store including the symbol.

The aforementioned structure makes it possible to store symbols used at high frequency (high-frequency symbols) in a data structure with the data access speed given priority and symbols used at low frequency (low-frequency symbols) in a data structure with the memory space efficiency given priority. By storing the symbols in a store of an appropriate type according to the frequency thereof, the memory space efficiency and the throughput are enhanced as a whole in actual data access.

The present invention will be described by using different embodiments, but these embodiment are to provide clarity of understanding and not to impose any limitations. Alternatives to such embodiments can be provided as can be appreciated by those skilled in the art. According to one embodiment, an information processing system for building a data store is provided. This can include one or more computing equipment and computer devices that can be used for building a key value store 100 which can be further configured to provide sort and store keys in multiple types of store operations.

FIG. 1 is a graphical illustration of Zipf's Law which holds true in a relationship between the frequency of a keyword and the ranking of the frequency thereof. The graph of FIG. 1 is created from 254,000,000 keywords in 687,000 records collected and disclosed by National Highway Traffic Safety Administration (NHTSA). FIG. 1 can be used to provide an empirical rule observed in words which are to be stored in the key value store 100 according to one embodiment. A specific structure of the key value store 100 can also be provided according to this embodiment.

Zipf's Law is an empirical rule showing that the percentage of an element used at frequency ranked k-th in a descending order in the total elements is in inverse proportion to k. FIG. 1 shows that keywords belonging to a high-frequency region representing top several percent contribute to hits which account for approximately 80% of the total hits, while keywords belonging to a low-frequency region representing bottom 80% contribute to hits which account for only approximately several percent of the total hits.

The key value store 100 according to this embodiment measures frequencies of symbols such as keywords in view of Zipf's Law which can be further observed in the frequencies of the keywords. This sorts each symbol, according to the frequency of the symbol and associates it to any one of the multiple types of data stores. This presents the trade-off relationship between the memory space efficiency and the data access speed as discussed. The key value stores built using one or more computing devices and equipments according to one of the embodiments of the present invention will be described in more detail later with reference to FIGS. 2 to 15.

Figure 2:
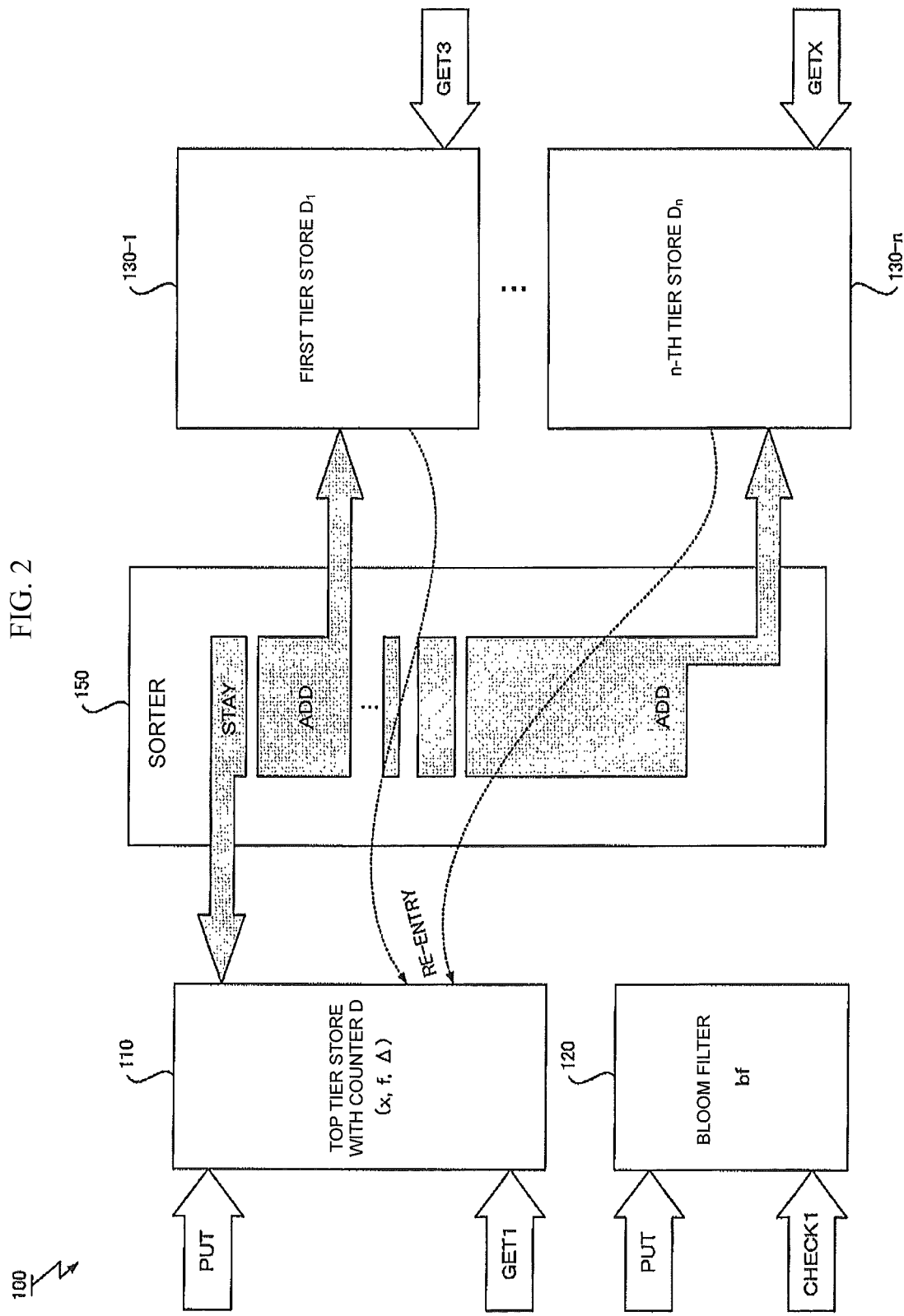
FIG. 2 is an illustration of a functional block diagram of a key value store built on a computing equipment in accordance with one embodiment of the present invention.

Functional blocks—FIG. 2 is an illustration of a functional block diagram of a key value store built on a computing device or equipment according to a first embodiment of the present invention. The key value store 100 shown in FIG. 2 includes, in a data structure, a top tier store 110 with a counter, a bloom filter 120, and one or more tier stores 130. The top tier store 110 is a data store for mainly storing keywords belonging to the high-frequency region in FIG. 1. In the top tier store 110, priority is given to the access speed in the trade-off relationship between the memory space efficiency and the access speed. The top tier store 110 is provided with a counter for each entry of a symbol which is configured to hold a frequency of the symbol. A value of the counter is referred to in sort processing performed according to the frequency. Details of this sort operation processing will be described later.

In contrast, the one or more tier stores 130 are data stores for mainly storing keywords belonging to a middle-frequency region and the low-frequency region which represent lower frequencies than the high-frequency region in FIG. 1. The one or more tier stores 130 have different characteristics from those of the top tier store 110, and priority is given to the memory space efficiency in the trade-off relationship. The one or more tier stores 130 store more enormous number of symbols than the top tier store 110. Hence, in this embodiment, the one or more tier stores 130 are not provided with the integer-type data counters configured to hold the frequencies of the symbols, and thus have compact data structures.

Types of the top tier store 110 and the tier stores 130 can be selected from any known data store types in consideration of the characteristic (the access speed or the memory space efficiency) given priority in the trade-off relationship. Examples of data store options include a hash map, a dynamic trie, and a static trie. The dynamic trie maintains a tree structure by using a data structure in which nodes have respective character arrays and a link structure such as a double-array, a transition table or a triple-array. In contrast, the static trie maintains its tree structure by using a succinct data structure such as LOUDS. Here, another tree such as a Patricia tree may be used instead of the trie in alternate embodiments as can be appreciated by those skilled in the art.

The hash map is characterized in that the data access speed is the highest in the data stores cited above because search and add operations are achieved in a constant time regardless of the number of elements but the memory space efficiency is relatively low. In addition, the hash map is a data structure which allows adding data easily. In contrast, the static trie is characterized in that the memory space efficiency is the highest in the data stores cited above but that the data access speed is relatively low. The dynamic trie such as the double-array has a higher data access speed than the static trie, while having higher memory space efficiency than the hash map. The dynamic trie allows data to be added more easily than the static trie does.

In another embodiment, the top tier store 110 can employ the aforementioned hash map. Each of the tier stores 130 can preferably employ any one of either the dynamic trie and/or the static trie arrangements. In a case where both the dynamic trie and the static trie are employed, one of the tier stores 130 can be defined as a higher tier store. In order to store higher-frequency symbols, dynamic trie can be employed, while a lower frequency symbol of the tier stores 130 can be employed for the static trie. In one example, in a case where a three-store structure is provided a top tier store 110, a first tier store 130-1, and a second tier store 130-2 is identified. In this structure the stores can use the hash map, the dynamic trie, and the static trie, respectively as appropriate.

The key value store 100 shown in FIG. 2 includes a sorter 150 operating in the background or the foreground of data operation performed on the key value store 100. The sorter 150 executes processing of sorting an inputted symbol into any one of the top tier store 110 and the one or more tier stores 130-1 to 130-$n$ by using a stream algorithm. More specifically, the sorter 150 counts the frequency of the inputted symbol in the top tier store 110, and determines, based on its counter value, an entry allowed to stay in the top tier store 110 and an entry to be extracted from the top tier store 110 and added to any one of the tier stores 130-1 to 130-$n$.

In addition, when a symbol stored in one of the tier stores 130 after once moved from the top tier store 110 is inputted again in the sorter 150, the sorter 150 makes a re-entry in the top tier store 110 for an entry corresponding to the symbol. As described above, the top tier store 110 holds count values of symbols, while the tier stores 130 are not provided with counters for the respective symbols. For this reason, once a symbol is moved from the top tier store 110 with the counter to any one of the tier stores 130, a count value of the symbol before the moving is lost. Hence, in this embodiment, at least one store-representative frequency value is defined for each tier store 130, the store-representative frequency value being representative of frequencies of symbols in the tier store 130. Although various values summarizing the frequencies of the symbols in the tier store 130 can be used as the store-representative frequency value, an average symbol frequency, the maximum frequency obtained in consideration of possible worst errors, or the like of the tier store 130 can preferably be used. In response to an access to a symbol which has been moved and whose entry has been deleted, the sorter 150 reads out the store-representative frequency value defined for one of the tier stores 130 including the symbol, restores a counter value lost due to the moving by using the store-representative frequency value, and then makes a re-entry in the top tier store 110 for the entry.

As described above, the sorter 150 operates in such a manner as to sort a higher-frequency symbol to a higher store of a higher access speed type and a lower-frequency symbol to a lower store of higher memory space efficiency. The Lossy counting method can be used as the stream algorithm described above, and the embodiment will be described below on the assumption that the sorter 150 counts the frequency of a symbol in accordance with the Lossy counting method. However, Probabilistic Lossy counting method and Mnemonic Lossy counting method which are improved counting methods of the aforementioned counting method may be employed for the stream algorithm.

The bloom filter 120 shown in FIG. 2 is a filter configured to determine that the key value store 100 stores a specific key on the basis of approximation or probability. The bloom filter 120 has k (a natural number of 1 or larger) hash functions defined therein, and the hash functions each map an inputted specific key to a position in a bit array. Suppose a case where a specific key is inputted in the k hash functions. When any one of obtained bits corresponding to k hash values is "0", this shows that the specific key is not included in the key value store 100. On the other hand, when all of the k obtained bits corresponding to the array index are "1", that is, enabled, this shows that the specific key might be included (might not be included depending on the case) in the key value store 100.

Upon receipt of a registration request (PUT) requesting registration of a "value" in the key value store 100 by using a "key", a system stores the "value" in the top tier store 110 in association with an entry of the "key". In response to the registration request (PUT), the system simultaneously enables the bits corresponding to the k hash values in the bloom filter 120 into "1". In addition, upon receipt of an acquisition request (GET) requesting acquisition of a "value" by using a "key", the system firstly makes an inquiry (GET1) to the top tier store 110. When the "key" in the acquisition request is found in the top tier store 110 with the counter, the system reads out the "value" associated with an entry of the "key" and returns the "value" to an acquisition request source. On the other hand, when the "key" is not found in the top tier store 110 with the counter, the system can subsequently make a check (CHECK2) for the presence of the "key" in the bloom filter 120.

When receiving an affirmative result from the bloom filter 120, the system makes inquiries (GET3 to GETX) to the first tier store 130-1 to the n-th tier store 130-$n$ in this order. When the "key" is found, the system reads out the "value" associated with an entry of the "key" from a corresponding one of the tier stores 130 and returns the "value" to the acquisition request source. When a negative result is returned from the bloom filter 120, it is clear that the "key" is not registered in the key value store 100. Thus, the system does not make inquiries to the tier stores 130 and immediately returns an error indicating that the "key" has not been registered yet to the acquisition request source. Also when the "key" is not found after the inquiry is made to the lowest tire store 130-$n$, the system returns the error indicating that the "key" has not been registered yet to the acquisition request source.

In this case, the timing of the inquiry to the bloom filter 120 is not particularly limited. However, when the top tier store 110 is the hash map, the inquiry to the bloom filter 120 can preferably be made after the inquiry to the top tier store 110 from the viewpoint of improving the access speed. In addition, when the tier stores 130 include the dynamic trie, the aforementioned inquiry to the bloom filter 120 is preferably made before an inquiry to one of the tier stores 130 which uses the dynamic trie, but may be made after the inquiry. When the tier stores 130 include the static trie, the aforementioned inquiry to the bloom filter 120 is preferably made before an inquiry to one of the tier stores 130 which uses the static trie. This can preferably improve the access speed even when a system structure includes the static trie in which the memory space efficiency is given priority.

To achieve high-speed data operations, the top tier store 110 with the counter, the bloom filter 120, and the one or more tier stores 130 preferably can preferably be implemented in a primary storage such as a random access memory (RAM) included in the computing equipment.

The sort processing to which the lossy counting method is applied (hereinafter LCM-applied sort processing) and which is executed by the sorter 150 will be described in more detail with reference to FIGS. 3 to 7. The LCM is a stream algorithm in which symbols having frequencies assigned rankings higher than a given ranking s (the degree of support) are enumerated while a given permissible error e in a frequency f is guaranteed. The LCM is an algorithm in which an inputted data stream is divided into units called buckets, frequencies of symbols constituting the data stream are counted, and entries of low-frequency symbols are excluded based on a past result on a bucket boundary basis. As described above, excluding the low-frequency symbols as appropriate in the course of the sort processing makes it possible to store a set of symbols used at frequency higher than a given frequency in a small memory area. In the first place, definitions will be shown below which are used in explaining the LCM-applied sort processing.

DEFINITIONS

D: A set of entries in the top tier store 110
x: A symbol (key)
f: The frequency (the number of use times) of the symbol x
$\Delta$: The maximum permissible error (error value) in the frequency f of the symbol x
Note that $\theta_i \Delta$ denotes the maximum error possibly included in the counted frequency f.
(x, f, $\Delta$): An entry (element) of the aforementioned set D
$D_i$: A set of entries in the i-th tier store 130-$i$ ($i=1$ to n)
Here, a suffix i denotes the ranking of a tier. Reference letter $D_1$ denotes the top tier store, and $D_n$ denotes the bottom tier store.
$\theta_i$: An upper frequency limit of a bucket (hereinafter, referred to as an in-bucket upper frequency limit) in the i-th tier store 130-$i$ The in-bucket upper frequency limit $\theta_i$ is given as a parameter and N is defined as the total frequency (the number of inputted data pieces) of all the inputted symbols. Overlappingly inputted data pieces are also counted. Some other definitions are provided as follows:
$N_i$: The total frequency of all of the symbols in the i-th tier store 130-$i$
$|D_i|$: The number of symbols in the i-th tier store 130-$i$
$w=1/e$: A width of a bucket
e: A permissible error in the number of use times
B=ceiling(eN): A bucket identification value for identifying a current bucket
$R_i$: A store-representative frequency value defined for the i-th tier store 130-$i$ When using the average symbol frequency, calculation of the store-representative frequency value $R_i$ is performed in accordance with the following equation (1). When using the maximum frequency, the calculation of the store-representative frequency value $R_i$ is performed in accordance with the following equation (2) by using the in-bucket upper frequency limit $\theta_i$ of the i-th tier store 130-$i$ and the current bucket identification value B. The maximum frequency shows the maximum value of the frequency of a symbol possibly occurring on the assumption that the frequency of the symbol is counted while an entry of the symbol has not been disposed of until a boundary with a preceding bucket.

[Formula 1]

$$R_i = \frac{N_i}{|D_i|} \quad (1)$$

$$R_i = \theta_i \times (B - 1) \quad (2)$$

Algorithms—

Figure 3:
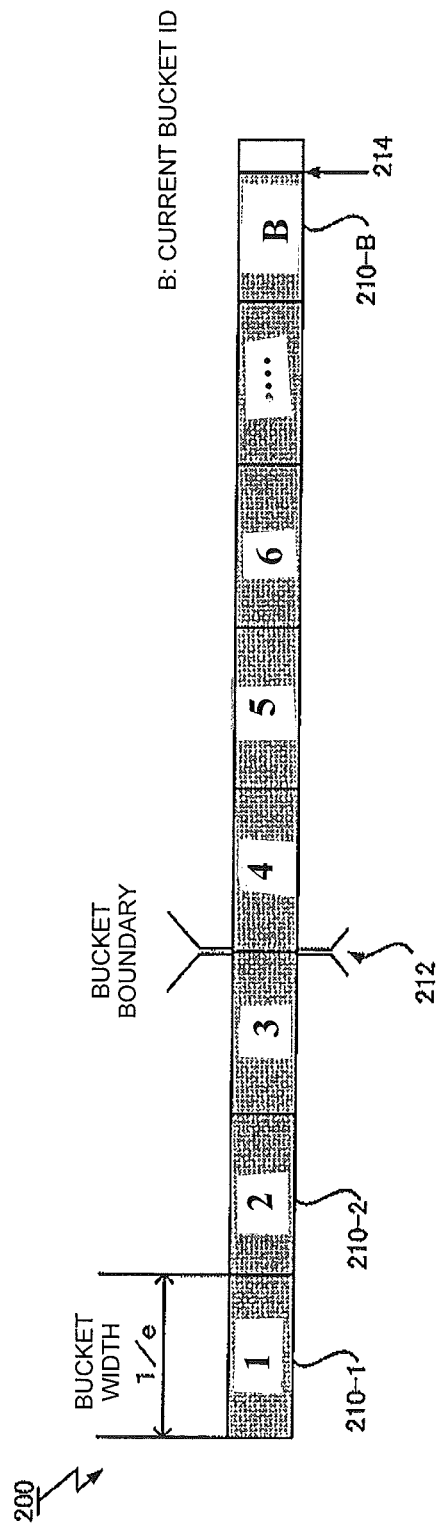
FIG. 3 is an illustration of a schematic diagram showing a data stream inputted to a sorter in accordance with one embodiment of the present invention.

FIG. 3 is an illustration of a schematic diagram showing a data stream 200 inputted in the sorter 150 in the first embodiment. Here, a description is given in the embodiment by taking as an example the data stream 200 continuously inputted without a break, but the present invention is applicable to a data set in predetermined size in other embodiment. In the LCM, symbol strings constituting the data stream 200 are divided into units called buckets 210 each having a predetermined width w(=1/e). Each of buckets 210-1, 210-2, ... is assigned a bucket identification value B according to the number of data pieces N inputted so far. For example, if an error of 1/1000 (e=1/1000) is permissible, the symbol strings are divided into buckets each including 1000 symbols, and continuous bucket identification values B (1, 2, ...) are assigned to the buckets.

Boundaries 212 between each adjacent buckets are referred to as bucket boundaries. The sort processing according to the frequency is executed at each bucket boundary. The buckets 210 receive symbol strings in the data stream 200 and are filled in order. At each bucket boundary, the sort processing is executed, and any low-frequency entry is disposed of from a set D in the top tier store 110. Then, each entry thus disposed of is stored in a corresponding one of the tier stores 130 according to the frequency thereof. In FIG. 3, the arrow 214 shows that the buckets are filled up to a position indicated by the arrow 214 by inputting the symbols in the sorter 150.

In the LCM-applied sort processing according to this embodiment, the sorter 150 repeatedly executes (A) count processing every access and (B) sort processing for each bucket which are to be described below.

Figure 4:
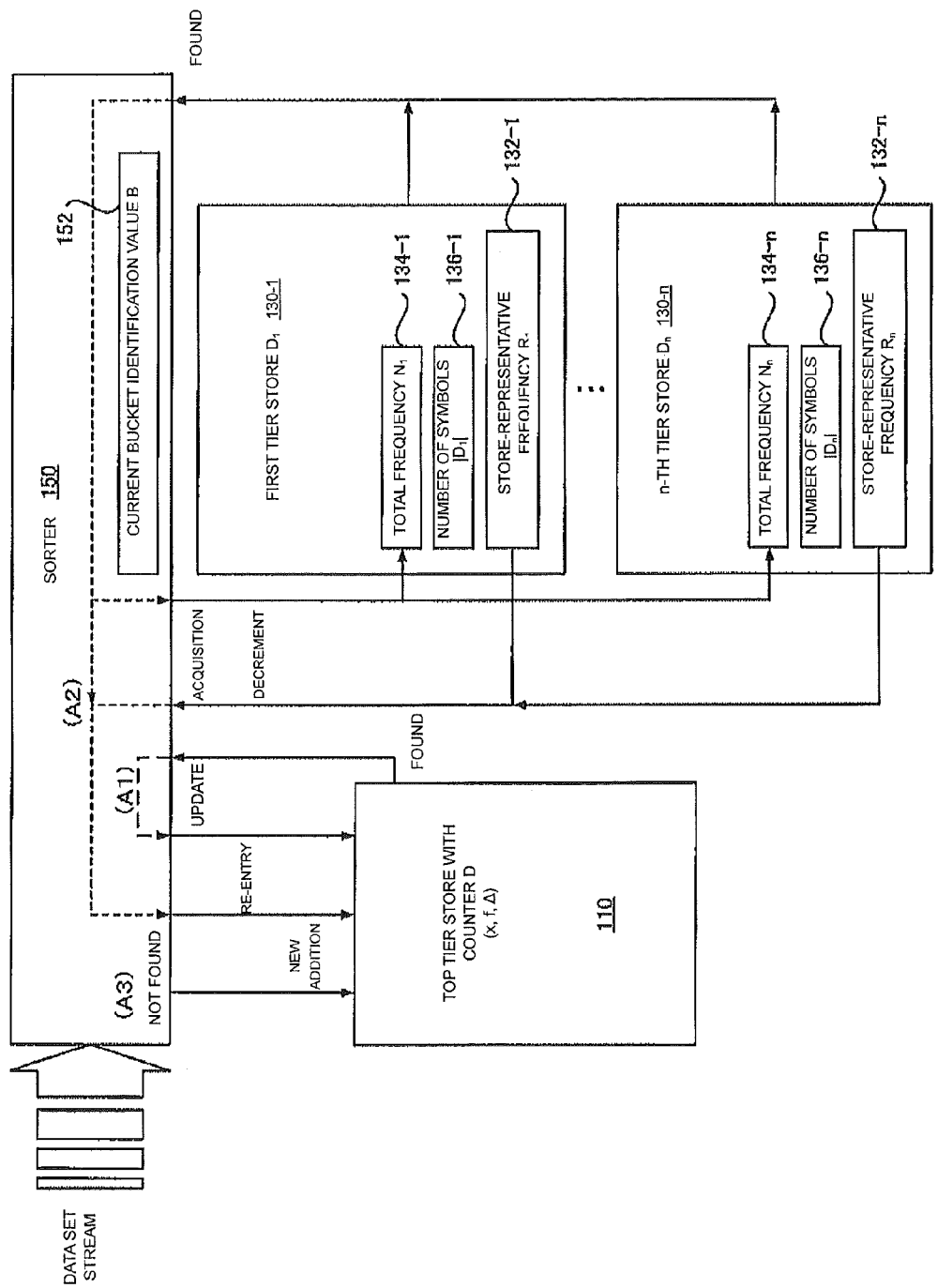
FIG. 4 is an illustration of a block diagram showing count processing via a sorter in accordance with one embodiment of the present invention.

(A) Count processing: The sorter 150 executes the count processing to be described in (A1) to (A3) below for each access to a symbol x. FIG. 4 is a diagram for explaining the count processing executed by the sorter 150 according to the first embodiment for each access to the symbol x.

(A1)—In the count processing, the sorter 150 refers to the top tier store 110. When the symbol x to be accessed is found in the set D, the sorter 150 increments the counter for the frequency of an existing entry of the symbol x and updates the counter to (x, f+1, Δ) ((A1) in FIG. 4).

(A2)—When the symbol x is not found in the set D, the sorter 150 further refers to the tier stores 130. When finding the symbol x in a set $D_i$ in the i-th tier store 130-$i$, the sorter 150 acquires a store-representative frequency value $R_i$ (132-$i$) defined for the i-th tier store 130-$i$ including the found symbol x, restores a counter value from the store-representative frequency value $R_i$ (132-$i$), and then makes a re-entry in the set D in the top tier store 110 for an entry (x, $R_i$, B−1). The found entry in the i-th tier store 130-$i$ is deleted from the i-th tier store 130-$i$, or is considered to have been deleted to be ignored. In conjunction with the re-entry, the sorter 150 further decrements the total number of use times $N_i$(134-$i$) of all the symbols in the i-th tier store 130-$i$ by the store-representative frequency value $R_i$ used in the re-entry ($N_i=N_i-R_i$) ((A2) in FIG. 4). In conjunction with the re-entry, the sorter 150 appropriately decrements the number of symbols |D| of the i-th tier store 130-$i$.

The maximum value (the maximum permissible error $\theta_i$(B−1)) in the frequency possibly occurring is given as the maximum permissible error Δ(=B−1) set here. The possibly occurring frequency is provided on the assumption that the frequency of a symbol is counted while an entry of the symbol has not been disposed of until a boundary with a preceding bucket, the entry is disposed of at a boundary of a current bucket, and then re-entry for the entry is made at the timing of the current bucket.

Here, when using the average symbol frequency, the calculation of the store-representative frequency value can be performed by using the total number of use times $N_i$(134-$i$) of the i-th tier store 130-$i$ and the number of symbols |$D_i$|(136-$i$). When using the maximum frequency, the calculation of the store-representative frequency value can be performed by using the in-bucket upper frequency limit $\theta_i$ for the i-th tier store 130-$i$ and a current bucket identification value B 152. Note that the average symbol frequency can preferably be selected as the store-representative frequency value from the average symbol frequency and the maximum frequency. This can prevent an increase of entries staying in the set D in the top tier store 110.

(A3)—When being not able to find the symbol x in the sets D and $D_i$ (i=1 to n) in spite of referring to all of the top tier store 110 and the one or more tier stores 130, the sorter 150 newly adds an entry (x, 1, B−1) in the set D in the top tier store 110 ((A3) in FIG. 4). A counter value of the frequency set here is an initial value, and the maximum permissible error Δ(=B−1) is the same as described above.

Figure 5:
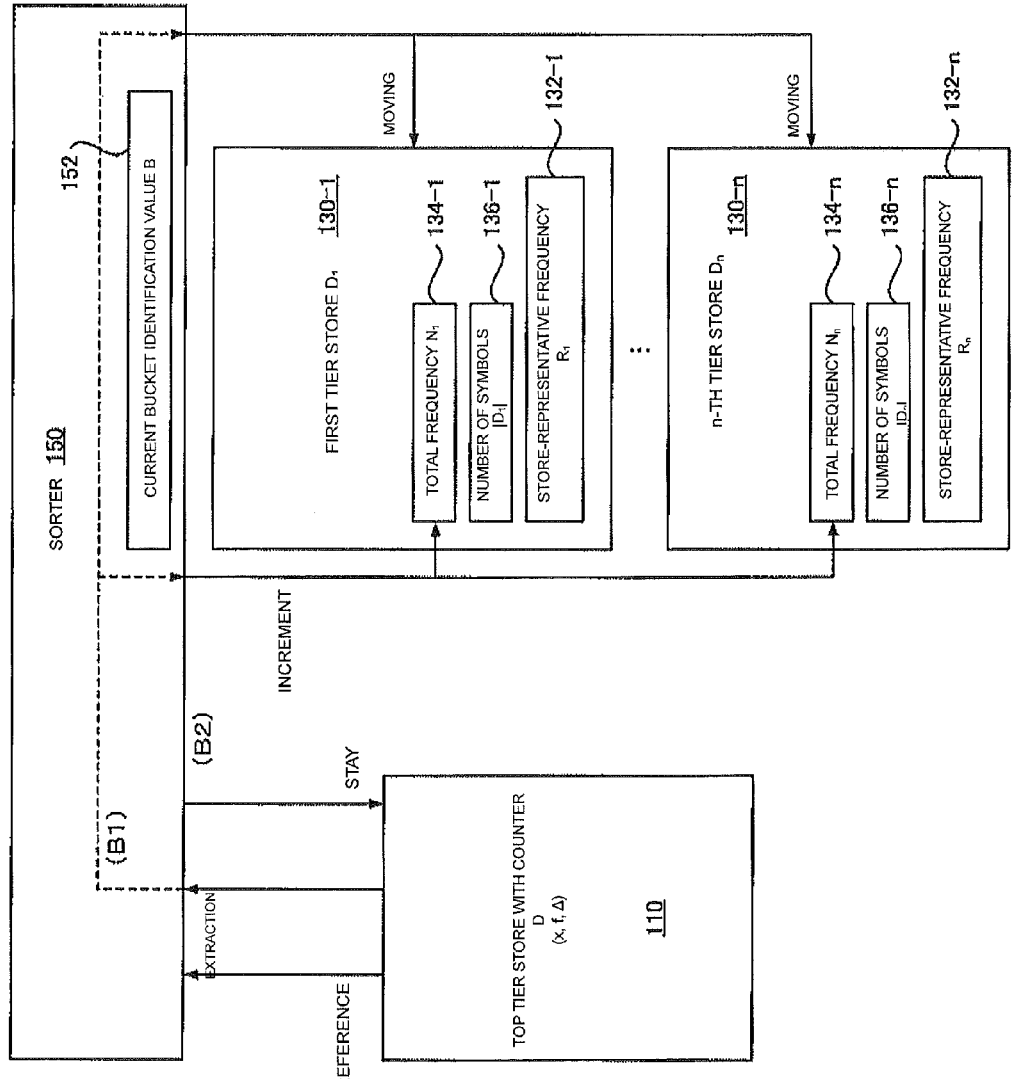
FIG. 5 is an illustration of a block diagram showing sort processing function for each of entries of symbols in accordance with one embodiment of the present invention.

(B) Sort processing—The sorter 150 executes the sort processing to be described in (B1) and (B2) below for each entry of a corresponding symbol in a bucket. FIG. 5 is a diagram for explaining the sort processing executed for each entry of a corresponding symbol in the bucket by the sorter 150 according to the first embodiment.

(B1)—When a frequency f of an entry (x, f, Δ), the maximum permissible error Δ, and the current bucket identification value B (=eN) satisfy, for a tier i, the following inequality (3), the sorter 150 moves the entry from the set D in the top tier store 110 to the set $D_i$ in the i-th tier store 130-$i$ ((B1) in FIG. 5). In the moving, the sorter 150 reads out the entry from the set D in the top tier store 110, adds the symbol of the entry in the set $D_i$ in the i-th tier store 130-$i$, and deletes the entry from the set D in the top tier store 110. This sorts a relatively-low-frequency entry in the top tier store 110 to any one of the tier stores 130 according to the frequency thereof. In conjunction with the moving, the sorter 150 increments the total frequency $N_i$ 134-$i$ of all of the symbols in the i-th tier store 130-$i$ by the frequency f of the moved entry ($N_i=N_i+f$). In conjunction with the moving, the sorter 150 appropriately increments the number of symbols |$D_i$|.

[Formula 2]

$$\theta_{i+1}(B-\Delta) < f \leq \theta_i(B-\Delta) \qquad (3)$$

(B2)—When the frequency f of the entry (x, f, Δ), the maximum permissible error Δ, and the current bucket identification value B (=eN) do not satisfy the above inequality (3), that is, when the entry (x, f, Δ) has the frequency f higher than $\theta_1$(B−Δ), the sorter 150 allows the entry (x, f, Δ) to stay in the set D in the top tier store 110 ((B2) in FIG. 5).

Figure 6A:
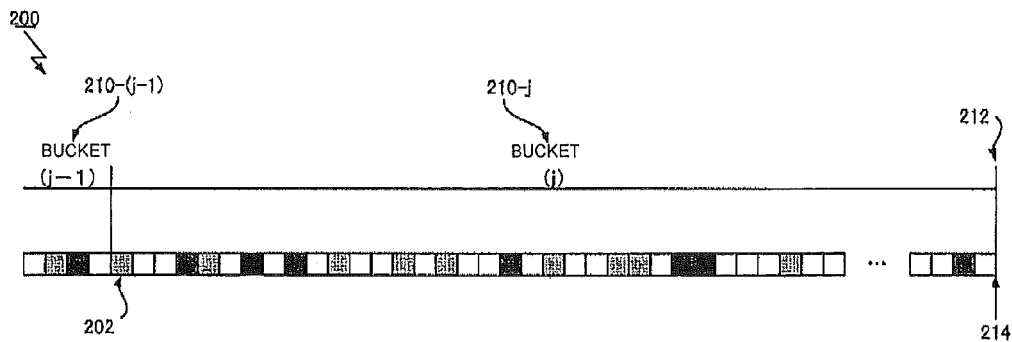
FIGS. 6A and 6B are illustrations respectively of a data stream in which density gradation is performed on symbols, and a defined frequency-f threshold $\theta_t(B-\Delta)$ for stores in accordance with one embodiment of the present invention.
Figure 6B:
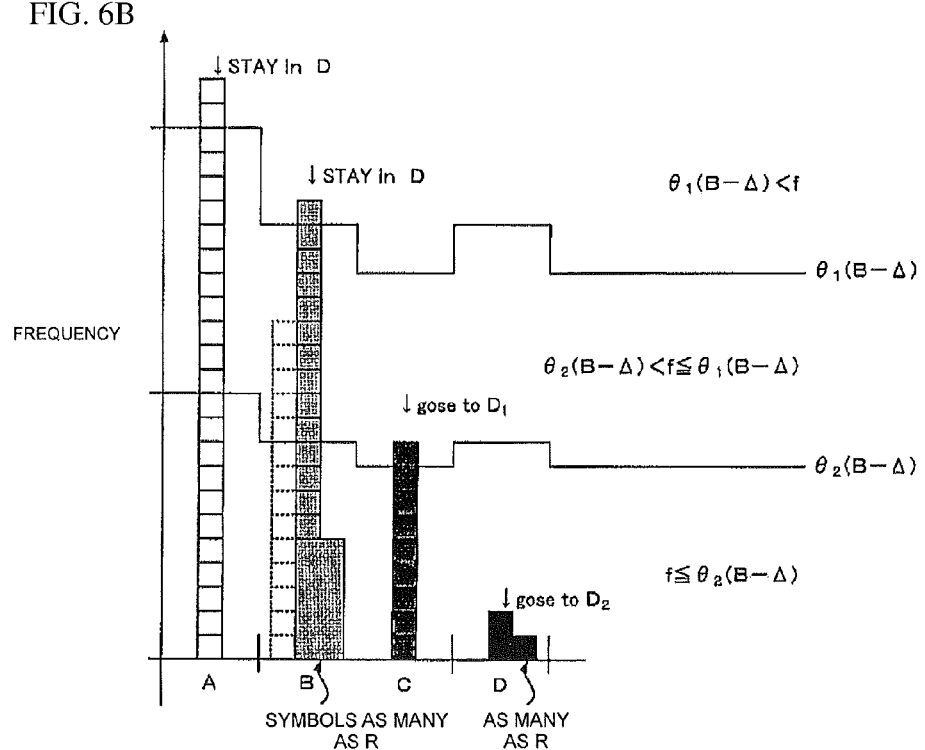

FIG. 6 is an illustration of diagram used for explaining how entries of symbols are sorted into the top tier store 110 and the tier stores 130 by the (B) sort processing. Here, FIG. 6 illustrates a key value store including a top tier store D and two tier stores $D_1$ and $D_2$. In particular, FIG. 6A shows the data stream 200 symbols in which are expressed in density degradation while FIG. 6B provides a diagram for explaining a frequency-f threshold $\theta_i$(B−Δ) for stores defined based on the maximum permissible error Δ in each entry and on the current bucket identification value B (B=eN which relates to the number of data pieces N inputted so far).

Upon input of the data stream 200 as shown in FIG. 6A, the frequency of each symbol is counted by the count processing as shown in FIG. 6B. In addition, the entry of the symbol stores the maximum permissible error Δ at the time point of adding the entry in the top tier store 110. Accordingly, the threshold $\theta_i$(B−Δ) represents an upper limit of the frequency f of the symbol to be sorted to the i-th tier store 130-$i$ after the maximum error ($\theta_i\Delta$) possibly included in the frequency f at the time point of adding the entry in the top tier store 110 is subtracted. Hence, a range of the frequency f of the symbol to be sorted to the i-th tier store 130-$i$ is defined from the in-bucket upper frequency limit $\theta_i$ of the i-th tier store 130-$i$ and an in-bucket upper frequency limit $\theta_{i+1}$ of the (i+1)th tier store 130-$i$+1 which is one tier lower than the i-th tier store 130-$i$.

Further, an entry for which the re-entry in the top tier store 110 is made includes a count value which is restored by using the store-representative frequency value $R_i$ of a tier store previously including the entry and on which the frequency in the past is thus reflected to some degree. Since the counting of the frequency of the entry for which the re-entry is made starts from the restored value, a symbol having used to a certain degree in the past is less likely to be moved again to any of the tier stores 130 after coming back to the top tier store 110 than in a case where the counting starts from a mere initial value (=1). For example, if the frequency f of a symbol "B" shown in FIG. 6B were counted from 1, the frequency f would not reach the threshold $\theta_1(B-\Delta)$, and thus an entry thereof should have been disposed of from the top tier store 110. However, since a counter value thereof is restored by using the store-representative frequency value $R_i$, the entry of the symbol "B" stays in the top tier store 110.

(C) Incorporation processing—In the LCM-applied sort processing according to this embodiment, the sorter 150 can repeatedly execute incorporation processing for each bucket. In the incorporation processing, when the frequency result of entries in a first tier store falls below the frequency result of a second tier store one tier lower than the first tier store, the entries are incorporated into the second tier store.

Figure 7:
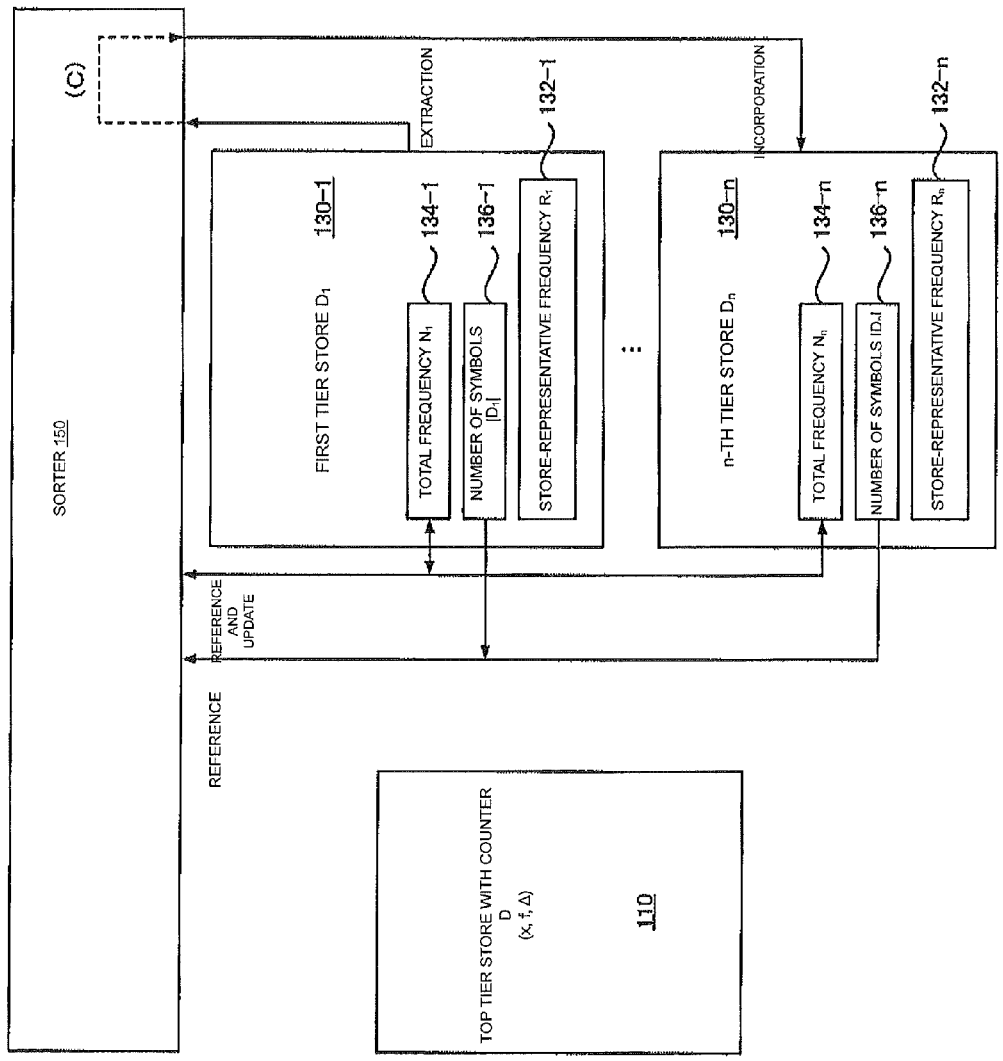
FIG. 7 is a diagram for explaining incorporation processing executed for each bucket by the sorter according to the first embodiment.

FIG. 7 is an illustration of a diagram used for explaining the incorporation processing executed by the sorter 150 for each bucket. In the incorporation processing, the sorter 150 determines, for each tier store 130-$i$ ($i$=1 to n−1), whether or not the frequency result of entries in the i-th tier store 130-$i$ falls below the frequency result of an (i+1)th tier store 130-($i$+1) lower than the i-th tier store 130-$i$. Here, μ in the following inequality (4) is a factor for specifying an incorporation condition in the incorporation determination and is given as a parameter. When there exists the higher i-th tier store 130-$i$ whose frequency result falls below the frequency result of the lower (i+1)th tier store 130-($i$+1) by a predetermined value, the sorter 150 extracts and incorporates all the entries in the higher i-th tier store 130-$i$ into the lower (i+1)th tier store 130-($i$+1) ((C) in FIG. 7). In conjunction with the incorporation, the sorter 150 further adds the total frequency $N_i$ of the higher i-th tier store 130-$i$ to the total frequency $N_{i+1}$ ($N_{i+1}$=$N_{i+1}$+$N_i$) and resets the total frequency $N_i$ to 0 ($N_i$=0). In conjunction with the incorporation, the higher i-th tier store 130-$i$ is excluded from the key value store 100.

[Formula 3]

$$\frac{N_i}{|D_i|} \le \mu\left(\frac{N_{i+1}}{|D_{i+1}|}\right) \quad (4)$$

Figure 8:
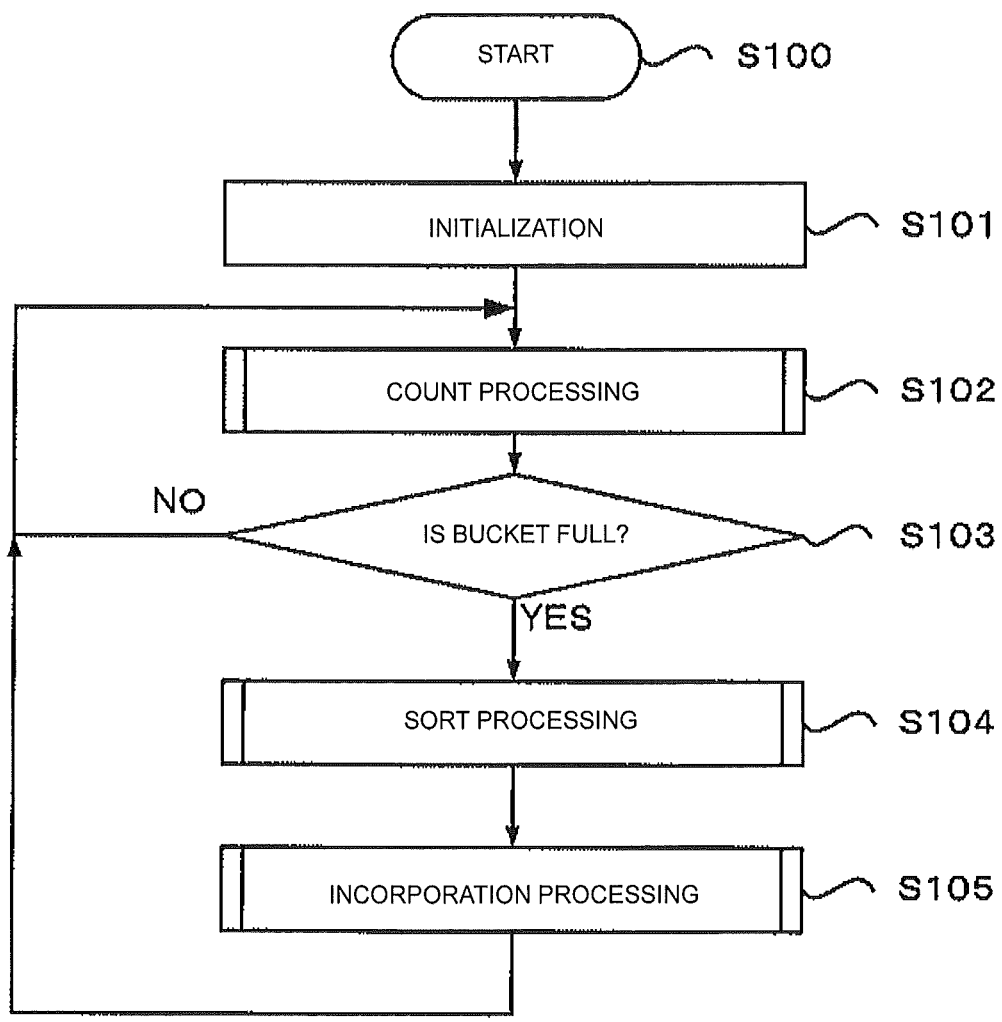
FIG. 8 is a flowchart illustration of sort processing to which the Lossy counting method is applied in accordance with one embodiment of the present invention.

(2.3) Processing flow—A flow of the LCM-applied sort processing executed by the sorter 150 will be described below in detail with reference to FIGS. 8 to 12. FIG. 8 is a flowchart showing a main flow of the LCM-applied sort processing executed by the sorter 150 according to the first embodiment.

The processing illustrated in FIG. 8 can be started from Step S100. In Step S101, the sorter 150 firstly performs initialization. In the initialization shown in Step S101, various parameters (e, $\theta_i$, μ) are acquired, the top tier store 110 and the tier stores 130 all of which are empty are prepared, and variables (N, $N_i$, |$D_i$|, and B) are set to respective initial values. In Step S102, the sorter 150 calls count processing shown in FIG. 9 for each access to a symbol x. A flow of the count processing will be described later with reference to FIG. 9. Upon completion of the count processing in Step S102, the sorter 150 moves the processing to Step S103. In Step S103, the sorter 150 determines whether or not a current bucket is full as a result of data stream input. When determining in Step S103 that the current bucket is not full (NO), the sorter 150 moves the processing to the Step S102 to iterate a loop and waits until an input position reaches a bucket boundary of the current bucket. When determining in Step S103 that the current bucket is full (YES), the sorter 150 moves the processing to Step S104.

In Step S104, the sorter 150 calls a sort processing flow which will be described in detail with reference to FIG. 10. Upon completion of the sort processing in Step S104, the sorter 150 moves the processing to Step S105. In Step S105, the sorter 150 calls an incorporation processing flow which will be described in detail with reference to FIG. 11. Upon completion of the incorporation processing in Step S105, the sorter 150 moves the processing to Step S102 again to iterate the loop. In the loop, the sorter 150 moves a processing target to the next accessed symbol, so that processing shown in Steps S102 to S105 are iterated.

Figure 9:
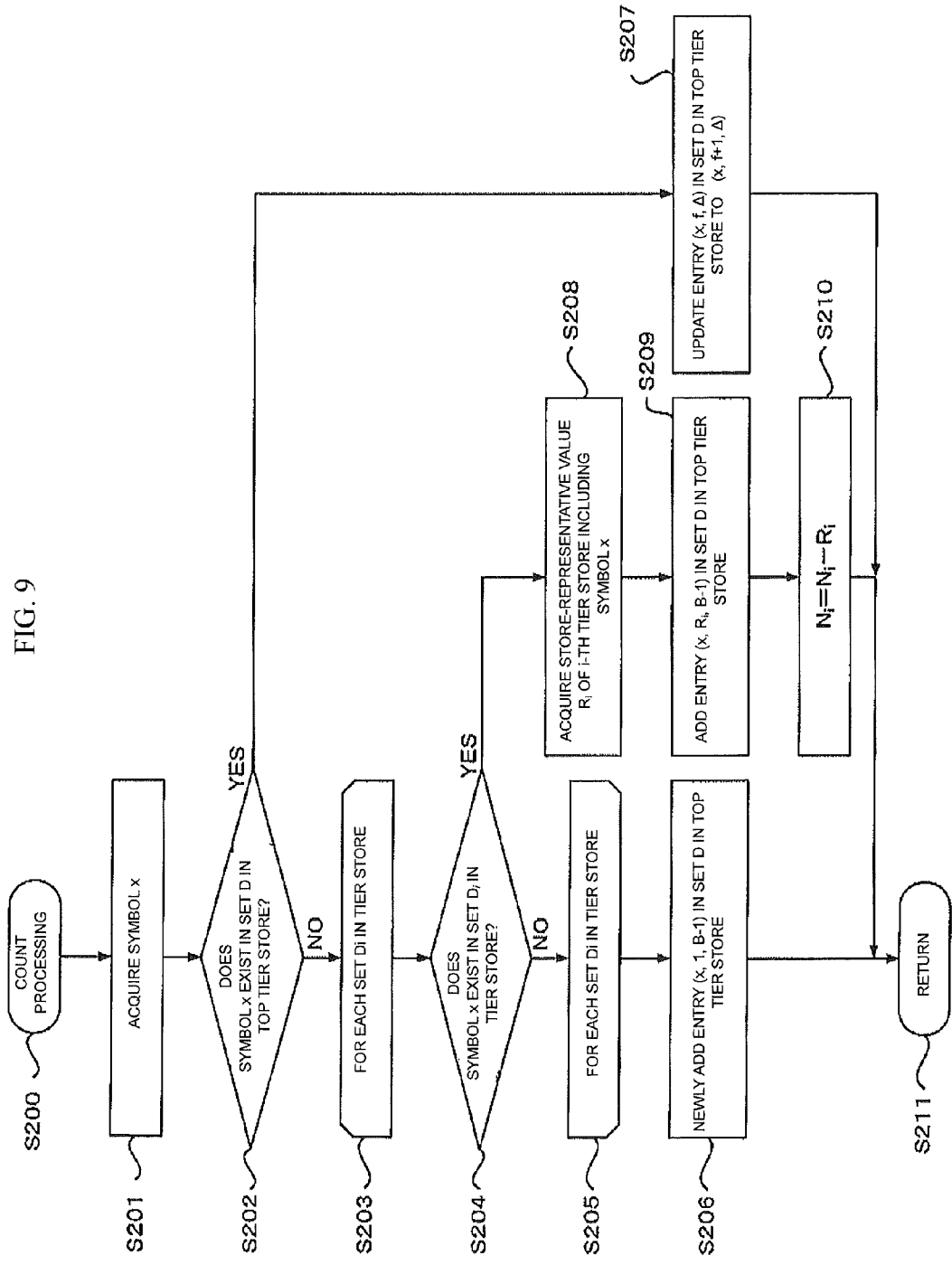
FIG. 9 is a flowchart illustration of count processing in accordance with one embodiment of the present invention.

FIG. 9 is a flowchart illustration showing the count processing executed by the sorter 150 according to the first embodiment every access. The count processing shown in FIG. 9 is called in Step S104 shown in FIG. 8 and is started from Step S200. In Step S201, the sorter 150 acquires a symbol x related to a current access. In Step S202, the sorter 150 refers to the top tier store 110 and determines whether or not the symbol x exists in the set D. When the symbol x is found in the set D in the top tier store 110 and thus determined as existing in the set D (YES) in Step S202, the sorter 150 branches the processing to Step S207. In Step S207, the sorter 150 updates an existing entry (x, f, Δ) in the set D in the top tier store 110 to (x, f+1, Δ) and returns the processing to the calling source in Step S211. When Step S207 results from an access in response to a registration request (PUT), a "value" in association with the entry in the set D in the top tier store 110 is overwritten in response to the access. When Step S207 results from an access in response to an acquisition request (GET), a "value" stored in association with the entry in the set D in the top tier store 110 is read out in response to the access, and is returned to the request source.

On the other hand, when the symbol x is not found in the set D and is determined as not existing therein (NO) in Step S202, the sorter 150 moves the processing to a loop shown by Steps S203 to S205. The loop of Steps S203 to S205 is performed for each set $D_i$ of the corresponding i-th tier store 130-$i$, the set $D_i$ being one of a set $D_1$ in the first tier store 130-1 to a set $D_n$ of the n-th tier store 130-$n$. In Step S204, the sorter 150 refers to the i-th tier store 130-$i$ and determines whether or not the symbol x exists in the set D. When it is determined in Step S204 that the symbol x exists in the set $D_i$ in the i-th tier store 130-$i$ (YES), the sorter 150 exits from the loop of Steps S203 to S205 and moves the processing to Step S208. In Step S208, the sorter 150 acquires the store-representative frequency value $R_i$ defined for the set $D_i$ in the i-th tier store 130-$i$ including the symbol x. The sorter 150 makes a re-entry for an entry (x, $R_i$, B−1) of the symbol x in Step S209, subtracts the store-representative frequency value from the total frequency $N_i$ of the i-th tier store 130-$i$ in Step S210, and returns the processing to the calling source in Step S211. When Step S209 results from an access in response to a registration request (PUT), a value is stored in the set D in the top tier store 110 in association with the entry in response to the access. When Step S209 results from an access in response to an acquisition request (GET), a value associated with a key included in the acquisition request is read out from the i-th tier store 130-$i$ in response to the access and returned to the request source. In addition, the value is stored in the top tier store 110.

On the other hand, when the symbol x is not found in the set $D_i$ in the i-th tier store 130-$i$ and is determined as not existing therein (NO) in Step S204, the sorter 150 moves the processing to Step S205. When the symbol x is not found in the set $D_n$ in the bottom tier store 130-$n$, the sorter 150 terminates the loop from Steps S203 to S205 to move the processing to Step S206. In this case, the symbol x is used for the first time. Thus, the sorter 150 adds an entry (x, 1, B−1) of the symbol x in the set D in the top tier store 110 in Step S206, and returns the processing to the call source in Step S211. When Step S206 results from an access in response to a registration request (PUT), a "value" is stored in the set D in the top tier store 110 in association with the entry. When Step S206 results from an access in response to an acquisition request (GET), the sorter 150 makes a reply indicating that a value associated with the referred key does not exist.

Figure 10:
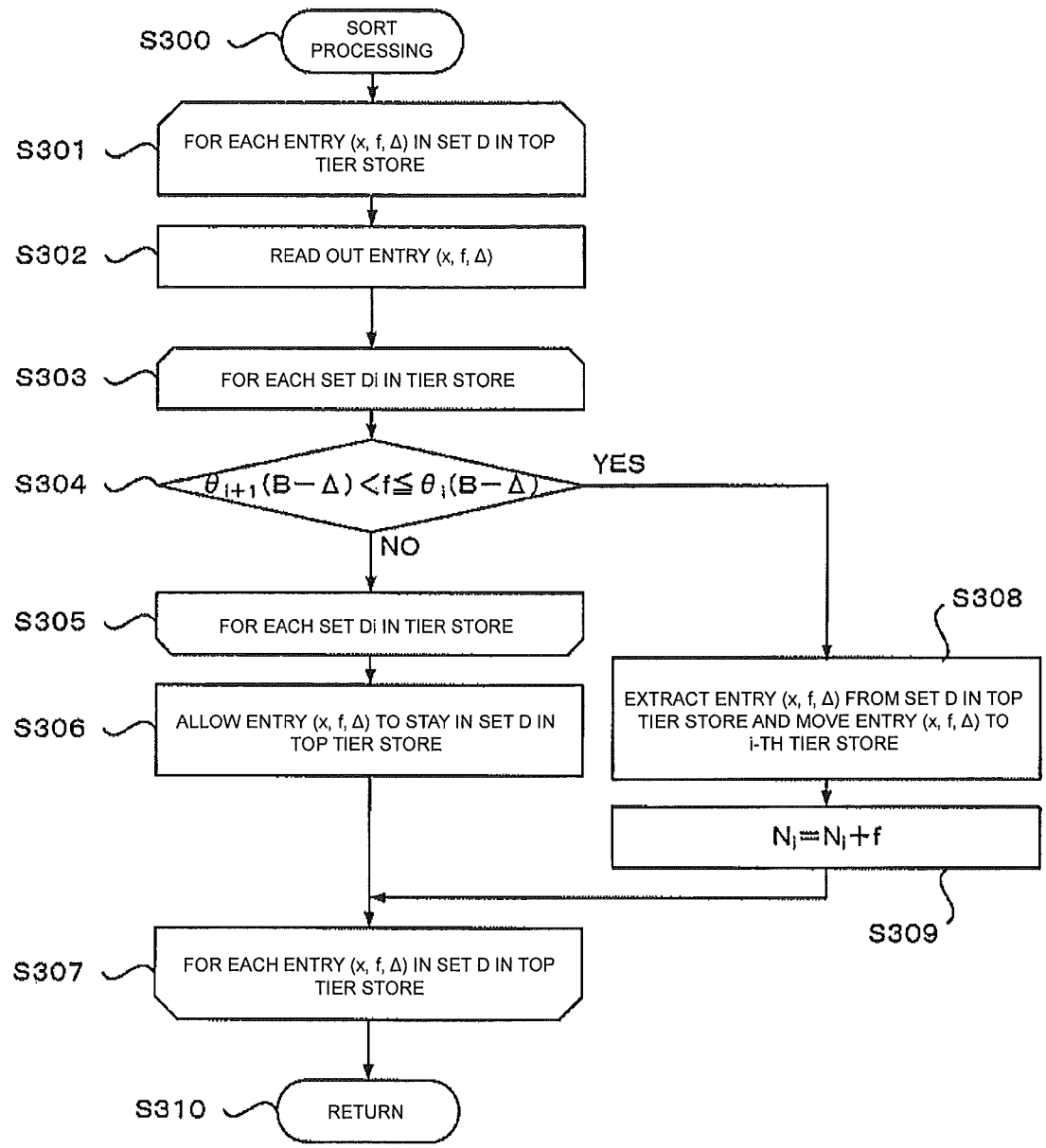
FIG. 10 is a flowchart illustration of sort processing via a sorter in accordance with one embodiment of the present invention.

FIG. 10 is a flowchart illustration showing the sort processing executed by the sorter 150 according to the first embodiment. The sort processing shown in FIG. 10 is called in Step S106 in FIG. 8 and is started from Step S300. In a loop from Steps S301 to S307, the sorter 150 executes processing shown in Steps S302 to S309 for each entry (x, f, Δ) in the set D in the top tier store 110. In Step S302, the sorter 150 reads out an entry (x, f, Δ) in the set D in the top tier store 110. The loop of Steps S303 to S305 is performed for each set $D_i$ of the corresponding i-th tier store 130-$i$, the set $D_i$ being one of the set $D_1$ in the first tier store 130-1 to the set $D_n$ of the n-th tier store 130-$n$. In Step S304, the sorter 150 determines whether or not the aforementioned inequality (3) for the sorting according to the frequency f of an entry is satisfied. When determining in Step S304 that the inequality (3) is satisfied (YES), the sorter 150 moves the processing to Step S308. In this case, the sorter 150 determines that the entry (x, f, Δ) is to be sorted to the i-th tier store 130-$i$. Thus, in Step S308, the sorter 150 extracts the entry (x, f, Δ) from the top tier store 110 and moves the entry (x, f, Δ) to the set $D_i$ in the i-th tier store 130-$i$. In Step S309, the sorter 150 subtracts the frequency f of the symbol x from the total frequency $N_i$, exits from the Steps S303 to S305, and branches the processing to Step S307.

When determining in Step S304 that the inequality (3) is not satisfied (NO), the sorter 150 moves the processing to Step S305. When the inequality (3) is not satisfied in every set $D_i$ (1 to n) of the i-th tier store 130-$i$, that is, when the frequency f is higher than $\theta_1(B-\Delta)$, the sorter 150 exits from the loop of Steps S303 to S305 and moves the processing to Step S306. In this case, the sorter 150 determines that the entry (x, f, Δ) is to be sorted to the top tier store 110, thus allows the entry (x, f, Δ) to stay in the set D in the top tier store 110 in Step S306, and moves the processing to Step S307. After the loop of Steps S301 to S307 are iterated for every entry (x, f, Δ), the sorter 150 returns the processing to the calling source in Step S310.

Figure 11:
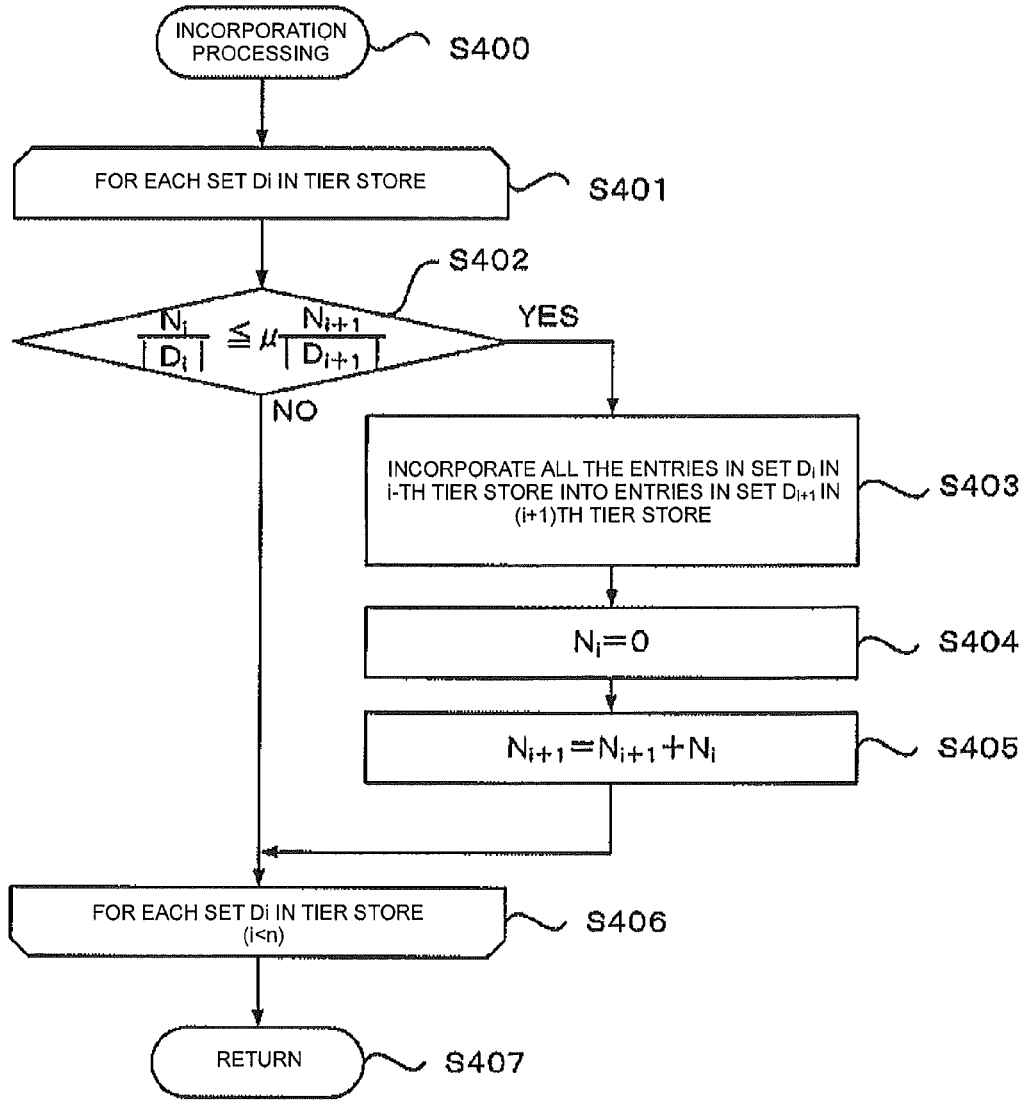
FIG. 11 is a flowchart illustration of incorporation processing via a sorter in accordance with one embodiment of the present invention.

FIG. 11 is a flowchart illustration of the incorporation processing executed by the sorter 150 according to the first embodiment. The incorporation processing shown in FIG. 11 is called in Step S107 in FIG. 8 and started from Step S400. The loop of Steps S401 to S406 is performed for each set $D_i$ of the corresponding i-th tier store 130-$i$, the set $D_i$ being one of the set $D_1$ in the first tier store 130-1 to the set $D_{n-1}$ of the (n−1)th tier store 130-$(n-1)$. In Step S402, by using the aforementioned inequality (4), the sorter 150 determines whether or not the frequency result of the i-th tier store 130-$i$ falls below the frequency result of the (i+1)th tier store 130-$(i+1)$ which is lower than the i-th tier store 130-$i$. When determining in Step S402 that the inequality (4) is satisfied (YES), the sorter 150 moves the processing to Step S403. In this case, the sorter 150 determines that the frequency result of the higher i-th tier store 130-$i$ falls below the lower (i+1)th tier store 130-$(i+1)$ by the predetermined value. In Step S403, the sorter 150 incorporates all the entries in the set $D_i$ in the higher i-th tier store 130-$i$ into the set $D_{i+1}$ in the lower (i+1)th tier store 130-$(i+1)$. The sorter 150 resets the total frequency $N_i$ of the higher i-th tier store 130-$i$ to in Step S404, adds the total frequency $N_i$ of the higher i-th tier store 130-$i$ to the total frequency $N_{i+1}$ of the lower (i+1)th tier store 130-$(i+1)$ in Step S405, and moves the processing to Step S406.

On the other hand, when determining in Step S402 that the inequality (4) is not satisfied (NO), the sorter 150 moves the processing to Step S406. When determining that the inequality (4) is not satisfied in every i-th tier store 130-$i$ (i=1 to n−1) and accordingly that there does not exist the higher i-th tier store 130-$i$ having the frequency result lower than the frequency result of the lower (i+1)th tier store 130-$(i+1)$, the sorter 150 exits from the loop of Steps S402 to S406, and returns the processing to the calling source in Step S407 without performing the incorporation.

(3) Advantages according to the first embodiment—According to the aforementioned first embodiment, high-frequency symbols are stored in the data structure with the data access speed given priority, and low-frequency symbols are stored in the data structure with the memory space efficiency given priority. Thereby, each symbol is stored in an optimum type of store according to its frequency. In actual data access according to Zipf's Law in particular, the memory space efficiency and the throughput are enhanced as a whole. In addition, the aforementioned first embodiment makes it possible to control the accuracy of extracting symbols according their frequencies by using permissible errors thereof. When an entry in the top tier store 110 is denoted by (x, fB, ΔB), it is guaranteed that the entry satisfies the following inequality (5) on the basis of the in-bucket upper frequency limit $\theta_1$ of the first tier store which is given as a parameter. Moreover, when an entry in the i-th tier store 130-$i$ (i=i to n−1) is denoted by (yi, fi, Δi), it is guaranteed that entries of the i-th and (i+1)th tier stores 130-$i$ and 130-$(i+1)$ satisfy the following inequality (6) on the basis of in-bucket upper frequency limits $\theta_i$ and $\theta_{i+1}$. Further, when an entry in the bottom tier store 130-$n$ is denoted by (z, fn, Δn), it is guaranteed that the entry satisfies the following inequality (7). Note that E( ) in the inequalities (5) to (7) denotes an average.

[Formula 4]

$$f_B > \theta_1(N - E(\Delta_B)) \tag{5}$$

$$\theta_{i+1}(N - E(\Delta_i)) < f_i \leq \theta_i(N - E(\Delta_i)) \tag{6}$$

$$f_n \leq \theta_n(N - E(\Delta n)) \tag{7}$$

In addition, according to the first embodiment, the store-representative frequency value $R_i$ is defined for each tier store 130-$i$. For an entry for which the re-entry is made from the i-th tier store 130-$i$ to the top tier store 110, the frequency is restored on which the past result is reflected to a certain degree based on the store-representative frequency value $R_i$. For this reason, even in a state where the bucket width is made short and accurate information of symbols used at middle frequency are lost, variation due to the moving of entries between the top tier store 110 and the tier stores 130 is reduced by restoring the appropriate frequency from the store-representative frequency value Further, the incorporation processing makes it possible to maintain the frequency extraction accuracy at a high level and to enhance the worst case performance.

An alternate embodiment (a second embodiment)—Although the description has heretofore given of the first embodiment for building the key value store 100 including the top tier store 110 and the one or more tier stores 130, descriptions will be given of more specific embodiments. Note that the description has been given in the first embodiment on the assumption that the counter value f is restored from the store-representative frequency value for an entry for re-entry. However, since the threshold $\theta_t(B-\Delta)$ in sorting is defined based on the relationship among the maximum permissible error $\Delta$, the frequency f, and the number of inputted data pieces N as described above, a store-representative value for restoring the maximum permissible error $\Delta$ can also be defined in other embodiments. Hereinbelow, a description is given of the second embodiment in which a key value store includes three data stores of a hash map store with a counter, a double-array store, and a LOUDS store and in which a store-representative value for restoring the maximum permissible error A is defined.

Figure 12:
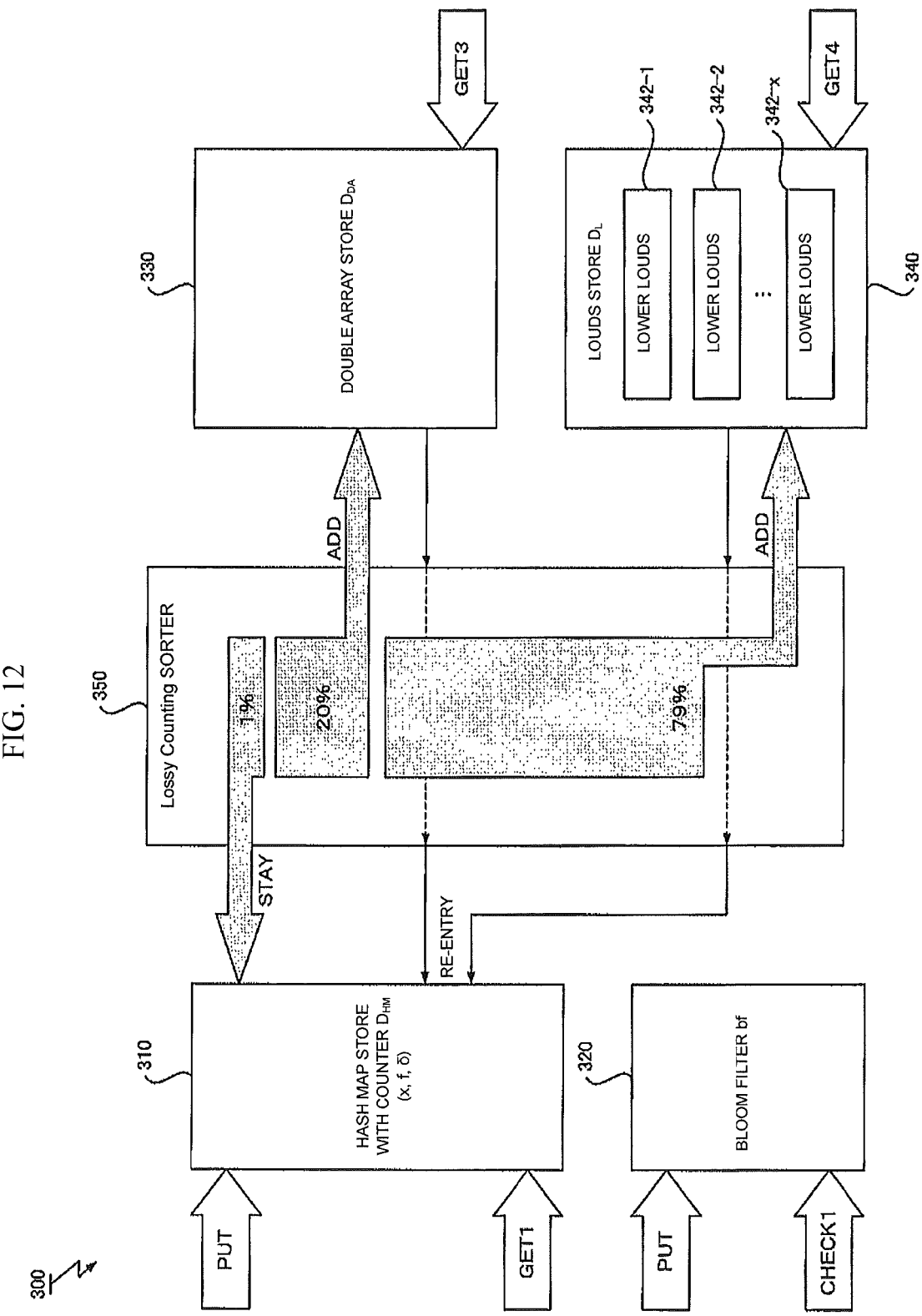
FIG. 12 is an illustration of a functional block diagram having a key value store built on a computing equipment in accordance with an alternate embodiment of the present invention.

FIG. 12 is an illustration of a functional block diagram of a key value store built on a computing equipment according to the second embodiment. A key value store 300 shown in FIG. 12 includes a hash map store 310 with a counter, a bloom filter 320, a double-array store 330, a LOUDS store 340, and a sorter 350. The hash map store 310 is a data store having excellent access speed and configured to store keywords belonging to the high-frequency region (approximately the top 1%) in FIG. 1. The hash map store 310 is provided with a counter holding the frequency of a symbol for each entry of a symbol. The LOUDS store 340 is a data store having excellent memory space efficiency and configured to store keywords belonging to the low-frequency region (approximately the bottom 79%) in FIG. 1. The double-array store 330 is a data store configured to store keywords belonging to the middle-frequency region in FIG. 1. The double-array store 330 is characterized in that its memory space efficiency is superior to that of the hash map store 310 and that its access speed is superior to that of the LOUDS store 340.

The LOUDS store 340 is a data structure in which addition is difficult as described above, and thus employs a facade structure in this embodiment. Specifically, the LOUDS store 340 includes lower LOUDS 342-1 to 342-x each storing m keys and handled as if these lower LOUDS's 342 were formed into a single data structure.

Figure 13:
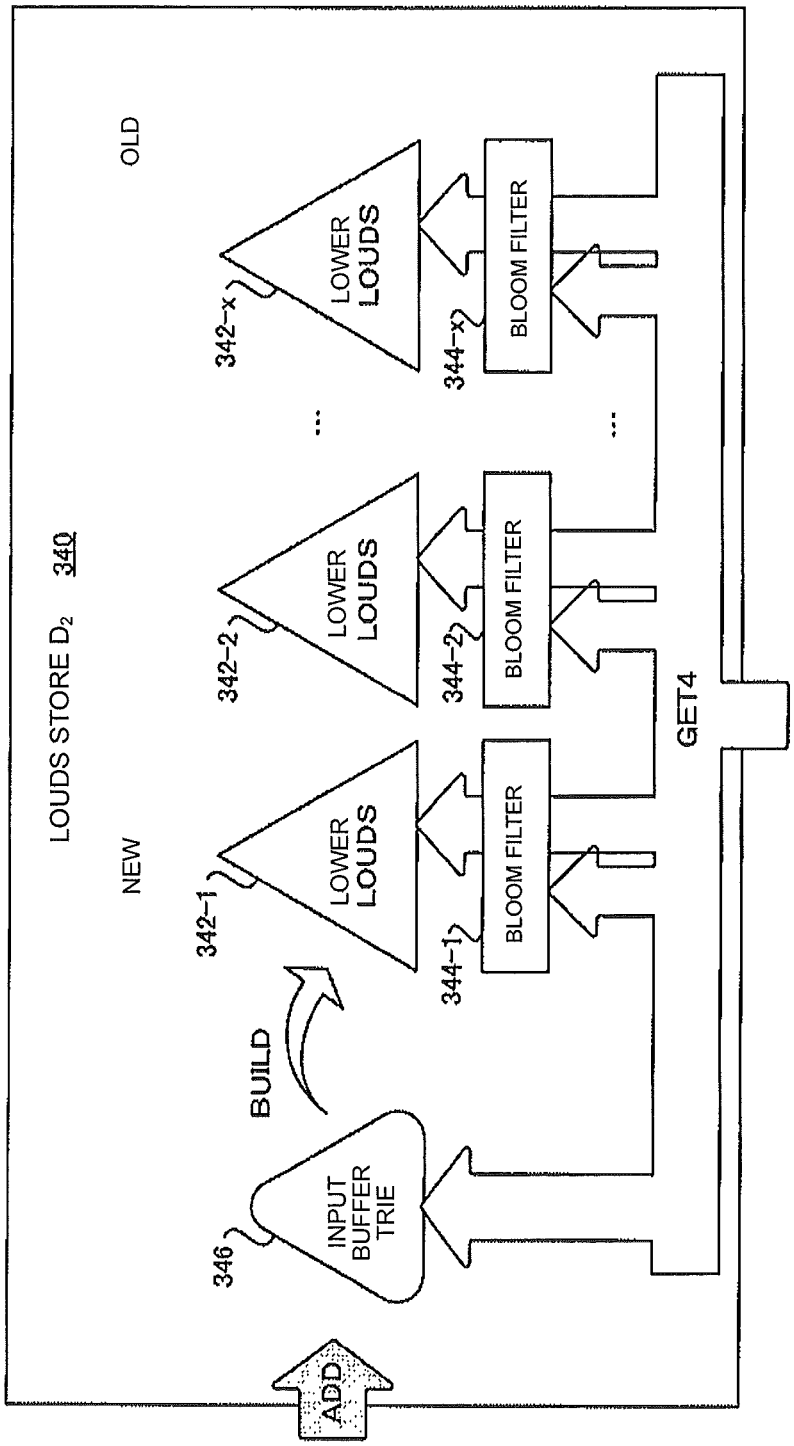
FIG. 13 is an illustration of more detailed functional view of a LOUDS store in accordance with an alternate embodiment of the present invention.

FIG. 13 is an illustration providing a diagram showing a more detailed functional block diagram of the LOUDS store 340 according to the second embodiment. The LOUDS store 340 includes an input buffer trie 346, and zero or one or more lower LOUDS's 342-1 to 342-x. The input buffer trie 346 is a buffer which maintains a trie storing entries of keys and values and allows entry addition. While LOUDS is a static trie difficult to allow entry addition, the input buffer trie 346 has a structure of a dynamic trie which maintains a tree structure by using a link structure and allows the entry addition. The lower LOUDS's 342 each have a succinct data structure which represents a trie storing a data set of m input data pieces out of the total number M of data pieces inputted in the LOUDS store 340.

The lower LOUDS's 342 are built during LOUDS building processing called every time the number of data pieces inputted in the input buffer trie 346 reaches the predetermined number m. The LOUDS store 340 can further include zero or one or more bloom filters 344 corresponding to the lower LOUDS's 342. Each bloom filter 344 is a filter configured to determine that a specific key exists in the corresponding lower LOUDS 342 on the basis of approximation or probability. The bloom filter 344 can be built together with the lower LOUDS 342 during the LOUDS building processing called every time the number of data pieces inputted in the input buffer trie 346 reaches the predetermined number m. When a data input request (ADD) is made to the LOUDS store 340, a key and a value is added to the input buffer trie 346. The LOUDS store 340 includes LOUDS building means which is not shown in FIG. 13. Every time the number of data pieces inputted in the input buffer trie 346 reaches the predetermined number m, the LOUDS store 340 scans nodes in the input buffer trie 346, and builds a lower LOUDS 342 representing the trie as well as a corresponding bloom filter 344. The LOUDS store 340 can also include LOUDS merge means which is not shown. By scanning nodes of multiple lower LOUDS's 342 in accordance with a predetermined strategy, the LOUDS store 340 can build a higher-level LOUDS representing a merge trie into which the multiple tries in its lower LOUDS 342 are merged, as well as a corresponding bloom filter. Specifically, the node scanning in building and merging can be performed based on breadth-first scanning.

When a key reference request (GET) is made to the LOUDS store 340, an inquiry is made to each of real data structures (the input buffer trie 346 and the lower LOUDS's 342 (including the corresponding bloom filters 344)) of the LOUDS store 340 in order from the lower LOUDS 342 built latest. When a referenced key is found in any of the real data structures, a value is returned. Thereby, the value (the latest, if multiple values exist) corresponding to the key stored in the LOUDS store 340 is returned to a request source. The aforementioned structure makes it possible to provide the LOUDS store 340 allowing easier addition than in the data structure including a single LOUDS and having higher memory usage efficiency and improved access speed.

A description is given in more detail of LCM-applied sort processing executed by the sorter 350 according to the second embodiment. Some of the definitions are provided as follows to aid in explaining the LCM-applied sort processing:

$D_{HM}$: A set of entries in the hash map store 310, the set $D_{HM}$ is stored in a top store.

$D_{DA}$: A set of entries in the double-array store 330, the set $D_{DA}$ is stored in a top tier store and middle store.

$D_L$: A set of entries in the LOUDS store 340, the set $D_L$ is stored in a bottom tier store and the lowest store.

$\Theta_{DA}$: An upper frequency threshold of the double-array store 330, the upper threshold $\Theta_{DA}$ is given as a parameter.

$\Theta_L$: An upper frequency threshold of the LOUDS store 340, the upper threshold $\Theta_L$ is given as a parameter.

x: A symbol (key)

f: The frequency of a symbol

δ: An estimated error (an error value) in the frequency f (x, f, δ): An entry (an element) of the aforementioned set $D_{HM}$ N: A total frequency (the number of inputted data pieces) of all the inputted symbols Overlappingly inputted data pieces are also counted.

$T_{DA}$: The total frequency of all of the symbols in the double-array store 330

DA: The number of symbols (keys) in the double-array store 330

$T_L$: The total frequency of all of the symbols in the LOUDS store 340

L: The number of symbols in the LOUDS store 340 w=1/e: A width of a bucket

B=ceiling(eN): A bucket identification value for identifying a current bucket $R_{DA}$: A store-representative value defined for the double-array store 330

When using the average symbol frequency, calculation of the store-representative value $R_{DA}$ is performed in accordance with the following equation (8). When using the maximum frequency, the calculation of the store-representative value $R_{DA}$ is performed, in accordance with the following equation (9), by using the upper threshold $\Theta_{DA}$ and the current bucket identification value B. Note that $R_L$ is A store-representative value defined for the LOUDS store 340 and the store-representative value $R_L$ is calculated in the same manner as for the store-representative value $R_{DA}$.

[Formula 5]

$$R_{DA} = \frac{T_{DA}}{\# DA} \quad (8)$$

$$R_{DA} = \frac{B-1}{e} \times \Theta_{DA} \quad (9)$$

As in the first embodiment, the inputted data stream 200 is divided into units called the buckets 210 each having a predetermined width w(=1/e). Each of the buckets 210-1, 210-2, . . . is assigned the bucket identification value B according to the number of data pieces N inputted so far. The buckets 210 receive the data stream 200 and are filled in order. At each bucket boundary, the sort processing is executed, and any low-frequency entry is disposed of from the set $D_{HM}$ in the hash map store 310. Then, each entry thus disposed of is stored in the double-array store 330 or the LOUDS store 340 according to the frequency thereof. In the LCM-applied sort processing according to this embodiment, the sorter 350 repeatedly executes (A) count processing for each access and (B) sort processing for each bucket. In addition, the sorter 350 can repeatedly execute (C) incorporation processing for each bucket.

(A) Count processing—The sorter 350 executes the count processing to be described in (A1) to (A4) below for each access to a symbol x.

(A1)—In the count processing, the sorter 350 refers to the hash map store 310. When the symbol x for the access is found in the set $D_{HM}$, the sorter 350 increments the counter for the frequency of an existing entry of the symbol x and updates the counter to (x, f+1, δ).

(A2)—When the symbol x is not found in the set $D_{HM}$, the sorter 350 further refers to the double-array store 330. When the symbol x is found in a set $D_{DA}$ in the double-array store 330, the sorter 350 acquires a store-representative value $R_{DA}$ defined for the double-array store 330, and then makes a re-entry in the set $D_{HM}$ in the hash map store 310 for an entry (x, 1, $R_{DA}$). In conjunction with the re-entry, the sorter 350 further decrements the total number of use times $T_{DA}$ of all the symbols in the hash map store 310 by the store-representative value $R_{DA}$ for the re-entry ($T_{DA}=T_{DA}-R_{DA}$). In conjunction with the re-entry, the sorter 350 appropriately decrements the number of symbols #DA of the hash map store 310.

In the second embodiment, when an entry is restored, the count value is not restored from the store-representative value. Instead, the count value is set at the initial value of 1 without addition of the store-representative value, and an estimated error δ is set based on the store-representative value $R_{DA}$. When the average symbol frequency is used as the store-representative value, the estimated error δ is estimated as an error possibly including average frequency. When the maximum frequency is used, the estimated error δ is given as the maximum value (maximum permissible error) in a possibly occurring frequency provided on the assumption that the frequency of a symbol is counted while an entry of the symbol has not been disposed of until a boundary with a preceding bucket, the entry is disposed of at a boundary of a current bucket, and then re-entry for the entry is made at the timing of the current bucket.

(A3)—When the symbol x is not found in the sets $D_{HM}$ and $D_{DA}$, the sorter 350 further refers to the LOUDS store 340. When finding the symbol x in the set $D_L$ in the LOUDS store 340, the sorter 350 acquires a store-representative value $R_L$ defined for the LOUDS store 340, and makes a re-entry in the set $D_{HM}$ in the hash map store 310 for an entry (x, 1, $R_L$). The counter value of the frequency f set here is the initial value of 1, and the estimated error δ is the same as the above.

(A4)—When being not able to find the symbol x in the sets $D_{HM}$, $D_{DA}$, $D_L$ in spite of referring to all of the hash map store 310, the double-array store 330, and the LOUDS store 340, the sorter 350 newly adds an entry (x, 1, 0) in the set $D_{HM}$ in the hash map store 310. The counter value of the frequency f set here is the initial value of 1, and the estimated error δ (=0) shows that the symbol x is used for the first time and an error is not included. However, a bucket identification value can be inputted in the estimated error δ.

(B) Sort processing—The sorter 350 executes the sort processing to be described in (B1) to (B3) below for each entry of a corresponding symbol in a bucket.

(B1)—When the frequency f of an entry (x, f, δ), the estimated error δ, and the number of data pieces N inputted so far satisfy the following inequality (10), the sorter 350 allows the entry to stay in the hash map store 310.

(B2)—When the frequency f of the entry (x, f, δ), the estimated error δ, and the number of data pieces N inputted so far satisfy the following inequality (11), the sorter 350 moves the entry from the set $D_{HM}$ in the hash map store 310 to the set $D_{DA}$ in the double-array store 330. In conjunction with the moving, the sorter 350 increments the total frequency $T_{DA}$ of all of the symbols in the double-array store 330 by the frequency f of the moved entry ($T_{DA}=T_{DA}+f$). In conjunction with the moving, when the symbol x does not exist in the set $D_{DA}$, the sorter 350 increments the number of symbols #DA in the double-array store 330 by the number of the moved entry (#DA=#DA+1).

(B3)—When the frequency f of the entry (x, f, δ), the estimated error δ, and the number of data pieces N inputted so far satisfy the following inequality (12), the sorter 350 moves the entry from the set $D_{HM}$ in the hash map store 310 to the set $D_L$ in the LOUDS store 340. In conjunction with the moving, the sorter 350 increments the total frequency $T_L$ of all of the symbols in the LOUDS store 340 by the frequency f of the moved entry ($TL=T_L+f$). In conjunction with the moving, when the symbol x does not exist in the set $D_L$, the sorter 350 increments the number of symbols #L in the LOUDS store 340 by the number of the moved entry (#L=#L+1).

[Formula 6]

$$(f+\delta) \geq \Theta_D N \quad (10)$$

$$\Theta_L N \leq (f+\delta) < \Theta_{DA} N \quad (11)$$

$$(f+\delta) < \Theta_L N \quad (12)$$

(C) Incorporation processing—In the incorporation processing, the sorter 350 determines whether or not the frequency result of the double-array store 330 located higher than the LOUDS store 340 falls below the frequency result of the LOUDS store 340 located lower than the double-array store 330, by using the following inequality (13). When the frequency result of the double-array store 330 falls below the frequency result of the LOUDS store 340 by a predetermined value, the sorter 350 extracts and incorporates all the entries in the double-array store 330 (excluding entries in the hash map store 310) into the LOUDS store 340. In conjunction with the incorporation, the sorter 350 further adds the total frequency $T_{DA}$ of the double-array store 330 to the total frequency $T_L$ of the LOUDS store 340 ($T_L=T_L+T_{DA}$: symbols in the hash map store 310 is excluded), adds the number of symbols #DA of the double-array store 330 to the number of symbols #L of the LOUDS store 340, and resets the total frequency $T_{DA}$ and the number of symbols #DA to 0.

[Formula 7]

$$R_{DA} < N\theta_L \left( \frac{\#L}{\#DA} + 1 \right) - \frac{\#L}{\#DA} \quad (13)$$

According to the second embodiment described above, each symbol is stored in an optimum type of store according to its frequency, as in the first embodiment. In actual data access according to Zipf's Law, the memory space efficiency and the throughput are enhanced as a whole. In addition, the second embodiment makes it possible to control the accuracy of extracting symbols according their frequencies by using permissible errors thereof. Here, when X is a random variable representing the number of accesses to a symbol x, it is guaranteed that an entry in the hash map store 310 satisfies the following equation (14) on the basis of the upper threshold $\Theta_{DA}$ given as a parameter. As for an entry in the double-array store 330, it is guaranteed that the entry satisfies the following inequality (15) on the basis of the upper threshold $\Theta_{DA}$ and $\Theta_L$ given as parameters. As for an entry in the LOUDS store 340, it is guaranteed that the entry satisfies the following inequality (16) on the basis of the upper threshold $\Theta_L$ given as a parameter. Note that E( ) in the equation (14) and the inequalities (15) and (16) denotes an average.

[Formula 8]

$$f+\delta \geq \Theta_{DA} N \Rightarrow E[X]=f+E[\delta] \geq \Theta_{DA} N \quad (14)$$

$$\Theta_L N \leq E[X] < \Theta_{DA} N \quad (15)$$

$$E[X] < \Theta_L N \quad (16)$$

In addition, according to the second embodiment, the store-representative values $R_{DA}$ and $R_L$ are defined for the double-array store 330 and the LOUDS store 340, respectively. For an entry for which the re-entry is made in the hash map store 310, the estimated error is set for which the past result is considered to a certain degree. For this reason, as in the first embodiment, variation due to the moving of entries among the hash map store 310, the double-array store 330, and the LOUDS store 340 is reduced. Further, the incorporation processing makes it possible to maintain the frequency extraction accuracy at a high level and to enhance the worst case performance.

Figure 14:
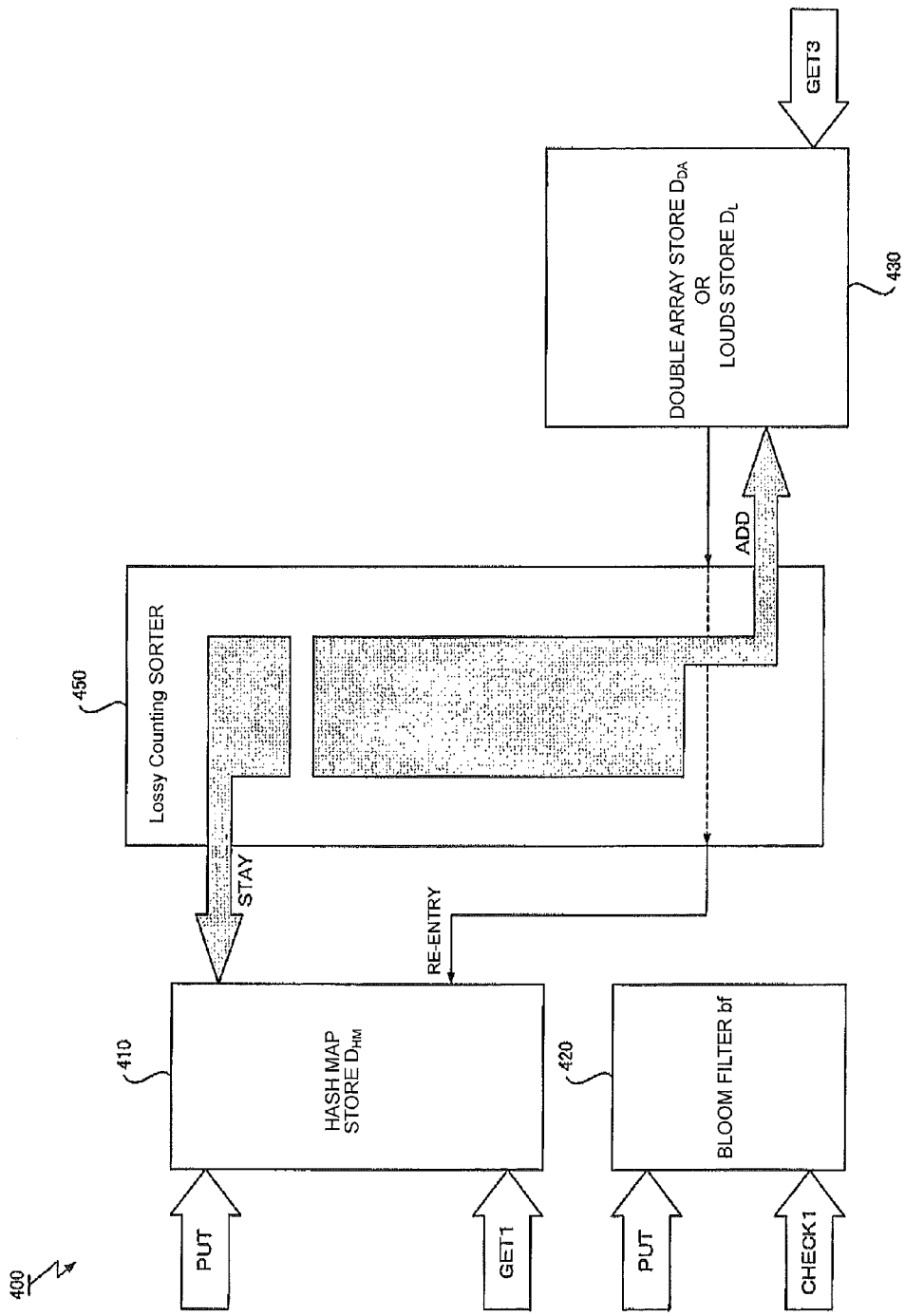
FIG. 14 is an illustration of a functional block diagram having a key value store built on a computing equipment in accordance with an alternate embodiment of the present invention.

Another alternate embodiment—(a Third embodiment)—The description has heretofore given of the second embodiment for building the key value store 300 including the hash map store 310, the bloom filter 320, the double-array store 330, and the LOUDS store 340. However, in a further embodiment, a key value store 400 can be configured by using two types of stores as shown in FIG. 14. The key value store 400 according to the third embodiment shown in FIG. 14 includes a hash map store 410 with a counter, a bloom filter 420, a store 430 constituted of either a double-array store or a LOUDS store, and a sorter 450. Also in the third embodiment shown in FIG. 14, the memory space efficiency and the throughput are enhanced as a whole in actual data access according to Zipfs Law. In addition, variation due to the moving of entries between the hash map store 410 and the store 430 can be reduced, and the worst case performance can be enhanced.

Figure 15:
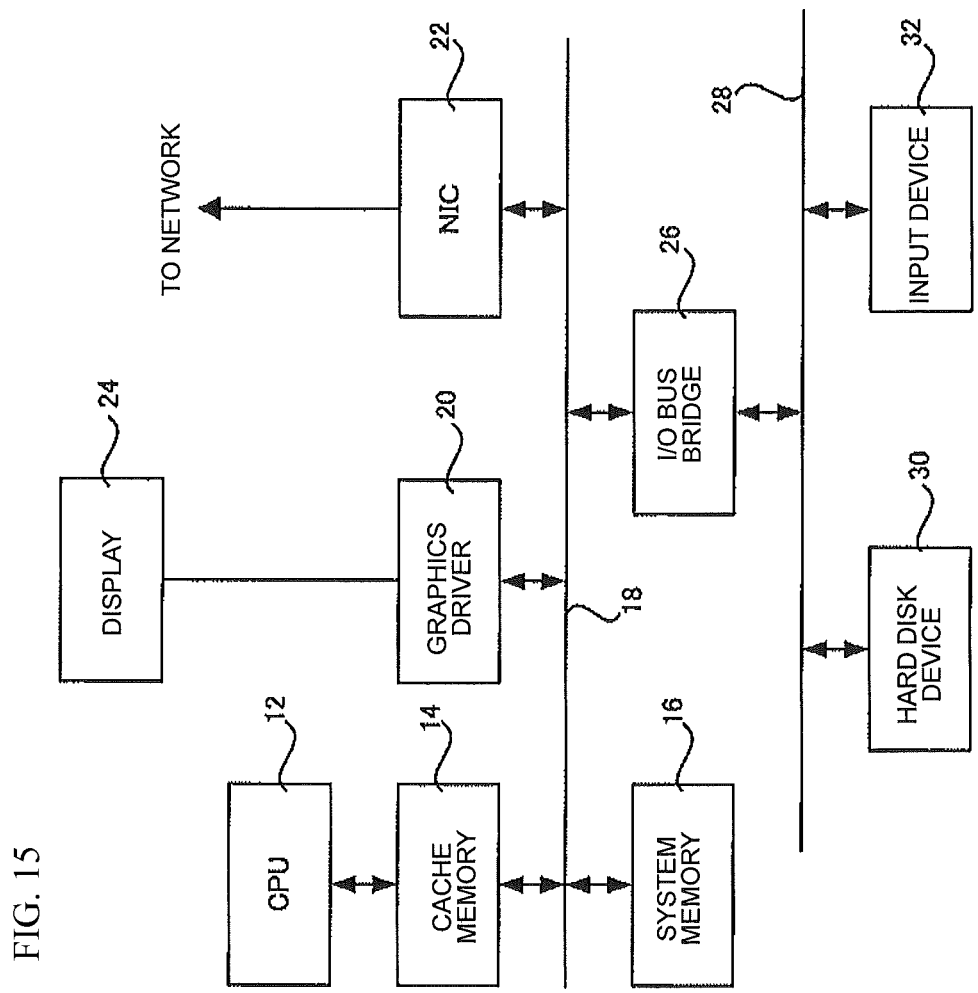
FIG. 15 is an illustration of a schematic hardware configuration of a computing equipment for building a key value store used in accordance with one or more embodiments of the present invention.

Hardware configuration—In one embodiment a description is given of a computing equipment or device. Computing equipment or device will be used interchangeable in this document. The device is used for building the key value stores according to the aforementioned embodiments. FIG. 15 is a schematic illustration of a hardware configuration of the computing device equipment for building the key value stores (100/300/400) as per one or more embodiments. The computing equipment includes a central processing unit (CPU) 12, a cache memory 14 having levels such as L1 and L2 to enable high speed access to data used by the CPU 12, and a system memory 16 formed by a solid-state memory device such as a DRAM to enable processing of the CPU 12. The system memory 16 provides a storage area for the data structure of any of the key value stores (100/300/400) of the embodiments.

The CPU 12, the cache memory 14, and the system memory 16 are connected to other devices or drivers such as a graphics driver 20 and a network interface card (NIC) 22, through a system bus 18. The graphics driver 20 is connected to an external display 24 through the bus and is capable of displaying a result of processing by the CPU 12. The NIC 22 connects, at levels of the physical layer and the data link layer, the computing equipment to a network using appropriate communication protocols such as TCP/IP.

To the system bus 18, an I/O bus bridge 26 is further connected. A hard disk device 30 is connected to the I/O bus bridge 26 on the downstream side of I/O bus bridge 26 through an I/O bus 28 in IDE, ATA, ATAPI, serial ATA, SCSI or USB connection. In addition, an input device 32 including a keyboard, a pointing device such as a mouse, and the like is connected to the I/O bus 28 through a USB bus or the like. A user interface using the input device 32 is provided.

Any single-core processor and any multi-core processor can be used as the CPU 12 of the computing equipment. The computing equipment is controlled by an operating system (hereinafter, referred to as an OS) such as WINDOWS® 200×, UNIX® or LINUX®. Under the control of the OS, the computing equipment loads programs into the system memory 16 or the like, executes the programs, and controls operations of hardware resources, and thereby implements the configuration of the aforementioned functional units and processing on a computing equipment.

Experiments—Implementation by a computing equipment or device—A computing equipment for device for building a key value store according to an example was implemented by using IntelliStation®. APro including two processors of Dual Core Opteron (registered trademark) of 2.2 GHz clock speed, a 2 MB secondary cache, a 4 GB PC3200 RAM, and two 750 GB HDDs (7200 rpm) with SATA interface. The OS of the computing equipment is Windows (registered trademark) 2003 Server Standard x64 Edition ServicePack2, and the programs were written in Java® language (Version 1.6.0).

Experiment results (throughput and memory consumption)—A system for building the key value store 300 shown in FIG. 12 was implemented on the computing equipment. The LOUDS store 340 was implemented by using the facade structure shown in FIG. 13. In the LOUDS store 340, the bloom filters 344 each had a structure in which an array having three bits per keyword was prepared and two hash functions each enable two bits. The error e was 1/20000. The upper thresholds $\Theta_{DA}$ and $\Theta_L$ were 1/4000 and 1/10000, respectively.

Data sets of 240 million keywords were overlappingly extracted by language processing from an automobile malfunction report database collected and made public by NHTSA and were inputted in the key value store 300. Average throughput and memory utilization in the input were measured. An average length of the keywords was about 27.2 characters, and the data sets included about 6.5 million unique keyword character strings. In addition, a key value store constituted of only a hash map store, a key value store constituted of only a double-array store, and a key value store constituted of only a LOUDS store were configured for the comparison purpose. The same data sets as the above were inputted therein, and the average throughput and the memory utilization were measured.

Experimental examples of the second embodiment (Hash Map+DA+LOUDS), using only the hash map store (Hash Map), using only the double-array store (Double Array TRIE), and using only the LOUDS store (LOUDS TRIE) in building the key value stores from the data sets are referred to as Experiment Example 1, Experiment Example 2, Experiment Example 3, and Experiment Example 4, respectively. Experiment Example 1 corresponds to an example of the described embodiments.

Table 1 below is summarizes the average throughput and the memory utilization measured in Experiment Examples 1 to 4 described above. As shown in Table 1 below, the key value store 300 in Experiment Example 1 recorded about half the memory utilization of the key value store constituted of only the double-array in Experiment Example 3 and average throughput close to that of the key value store constituted of only the double-array. This showed that, in actual data access approximately in accordance with Zipf's Law, the key value store according to the embodiment can exhibit a more excellent performance than the implementations using only the hash map store, only the double-array store, and only the LOUDS store, from a comprehensive viewpoint of the memory space efficiency and the throughput.

TABLE 1

| Experiment examples | throughput (keys/sec) | memory utilization (bytes) |
| --- | --- | --- |
| Hash Map + DA + LOUDS (Experiment Example 1) | 201,613 | 88,573,336 |
| Hash Map (Experiment Example 2) | 550,095 | 336,237,216 |
| Double Array TRIE (Experiment Example 3) | 207,364 | 176,910,320 |
| LOUDS TRIE (Experiment Example 4) | 26,093 | 66,937,904 |

(7-3) Experiment Results (Return Rate and Residual Rate)

Time-dependent changes of a return rate, a residual rate, and a hit rate were measured. The return rate is the percentage of the number of symbols returned from a store other than the hash map store 310 to the hash map store 310 in the total number of symbols stored in the hash map store 310, the entries being processed for each bucket in inputting the data sets. The residual rate is a percentage of entries staying in the hash map store 310 in the total entries stored in the hash map store 310 in sorting the symbols. The hit rate is the percentage of entries hit in the hash map store 310 in the total number of symbols. In addition, memory consumption of the key value store finally obtained after the inputting of the data sets was measured.

For the purpose of comparison, a system in which entries were not restored by using the store-representative values was built in a system for building the key value store 300 shown in FIG. 12. The same data sets were inputted therein, and time-dependent changes of the return rate in inputting the data sets, the residual rate, and the hit rate were measured. In addition, memory consumption of the key value store finally obtained after the inputting of the data sets was measured.

Other Experiment examples—in building the key value store from the data sets, the system according to the second embodiment, and the system which is based on the second embodiment but in which entries are not restored by using the store-representative values are referred to as Experiment Example 5 and Experiment Example 6, respectively. Experiment Example 5 corresponds to an example of the embodiments.

Figure 16A:
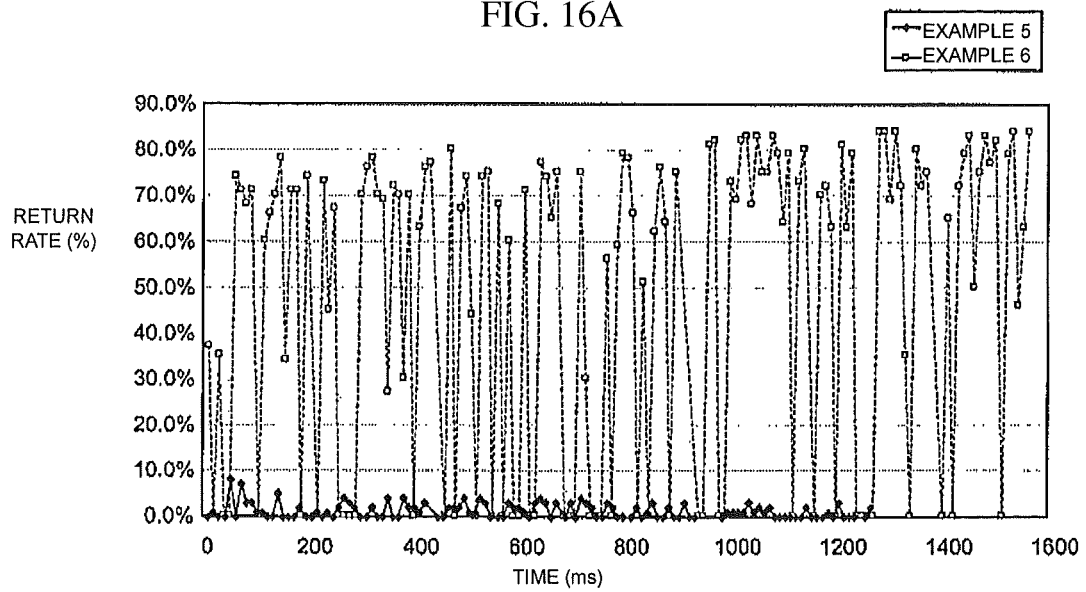
FIGS. 16A and 16B are illustrations of line graphs respectively providing time-dependent changes of a return rate and a residual rate measured in Experimental Examples 5 and 6 in accordance with an embodiment of the present invention.
Figure 16B:
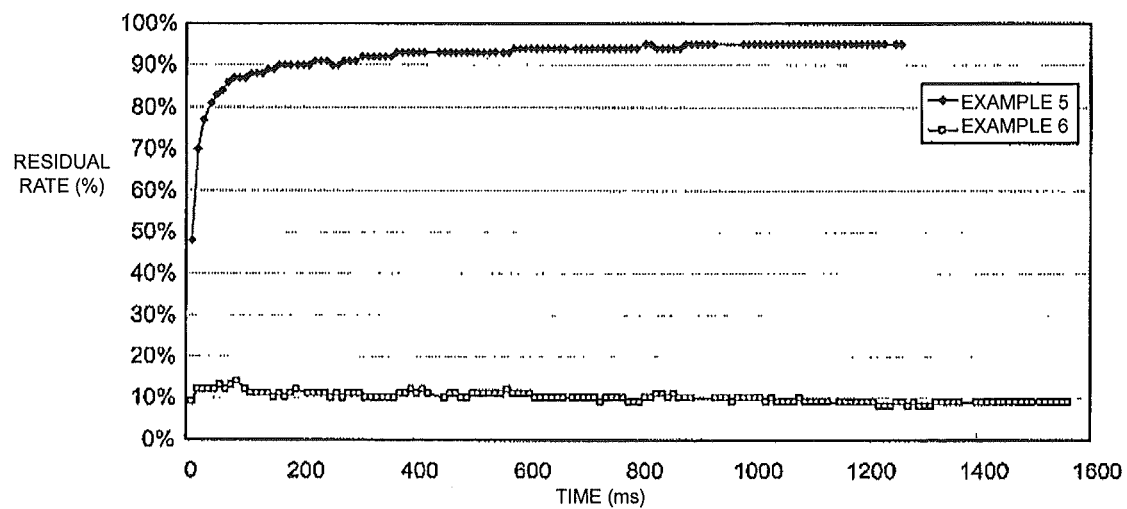
Figure 17A:
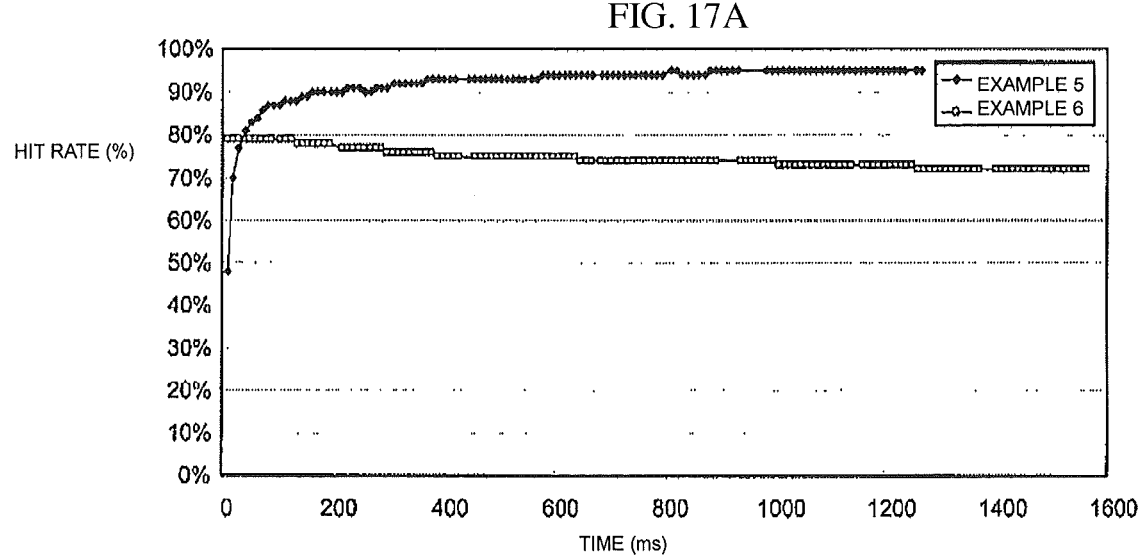
FIG. 17A is an illustrations of a line graph showing time-dependent changes of a hit rate in accordance with an alternate embodiment of the present invention.
Figure 17B:
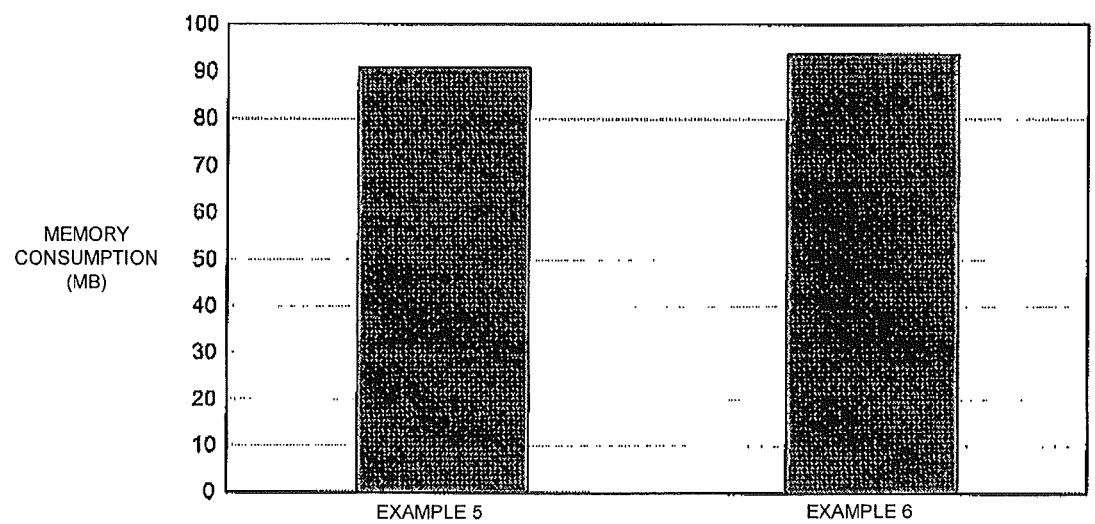
FIG. 17B is a bar graph illustration of a memory consumption key value stores in accordance with an alternate embodiment of the present invention.

FIG. 16A is a line graph plotting the time-dependent changes of the return rate measured in Experiment Examples 5 and 6 mentioned above. FIG. 16B is a line graph plotting the time-dependent changes of the residual rate measured in Experiment Examples 5 and 6. FIG. 17A is a line graph plotting the time-dependent changes of the hit rate measured in Experiment Examples 5 and 6. FIG. 17B is a bar graph plotting finally obtained memory consumption of the key value stores in Experiment Examples 5 and 6. Note that in FIGS. 16A, 16B, and 17A, time represented by the horizontal axis corresponds to the number of inputted data pieces.

As shown in FIG. 16A, the system (Experiment Example 6) in which entries are not restored by using the store-representative values shows that the return rate fluctuates largely with the elapse of time, thus showing high values. In contrast, it is learned that the system according to the second embodiment (Experiment Example 5) in which entries are restored by using the store-representative values exhibits the return rate maintained at a low level constantly. As shown in FIG. 16B, it is learned likewise that the system in Experiment Example 6 exhibits low values of the residual rate regardless of the elapse of time while the system according to the second embodiment in Experiment Example 5 exhibits the residual rate improved with the elapse of time and to about 93% finally. With reference to FIG. 17A, it is learned likewise that the system in Experiment Example 6 exhibits the hit rate gradually decreasing with the elapse of time while the system according to the second embodiment in Experiment Example 5 exhibits the hit rate improving with the elapse of time.

In addition, as shown in FIG. 17B, there was no big difference in memory consumption between the system in Experiment Example 6 and the system according to the second embodiment in Experiment Example 5, and the result was that the system according to the second embodiment has a slightly smaller memory consumption. A lower return rate, a higher residual rate, and a higher hit rate are evaluated as having a higher accuracy. It is shown that Experiment Example 5 exhibits the improved accuracy in all viewpoints of the return rate, the residual rate, and the hit rate as compared to Experiment Example 6 in which entries are not restored by using the store-representative values.

The improvement of the return rate, the residual rate, and the hit rate in the system according to the second embodiment is considered to be attributable to the restoration of the store-representative values which causes the frequencies of the symbols to be appropriately evaluated, makes high-frequency symbols likely to stay in the hash map store 310, makes low-frequency symbols once disposed of unlikely to return to the hash map store 310, and thus reduces the variation due to the moving among the hash map store 310 and the stores 330 and 340.

As described above, the embodiments of the present invention can provide an information processing system, and a data store operation method and program for building a data store that is buildable in an on-line environment and achieves high space efficiency for storing keys and high data access speed. Note that although the functional units and the processing of the functional units of the present invention have been described for easy understanding of the invention, the present invention makes it possible to not only allow the specific functional units described above to execute the specific processing but also assign the processing described above to any functional unit in consideration of the processing efficiency and the programming efficiency in the implementation. It goes without saying that the present invention is applicable to not only character strings using, as keys, one-byte characters which serve as symbols but also character strings using multi-byte characters such as Japanese, Chinese, Korean, and Arabic.

The functions of the embodiments discussed can be implemented by a device-executable program written in an object-oriented programming language such as C++, Java®, JavaBeans®, Java® Applet, JavaScript®, Perl or Ruby. The program can be stored in a device-readable recording medium and thus be distributed, or can be transmitted and thus be distributed.

The present invention has been described above by using the specific embodiments, but is not limited thereto. The present invention can be changed within a range in which those skilled in the art can come up with by implementing another embodiment, or by adding, changing, or omitting any element of the present invention. Any modes thus made should be included within the scope of the present invention, as long as these modes provide the same operations and advantageous effects as those of the present invention.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

In the course of the description one or more illustrative implementation of one or more embodiments were provided. However, the disclosed systems and/or methods may be implemented using any number of techniques as known to those skilled in the art and these description were provided only for ease of clarity with an understanding that their disclosure should in no way be limited to the illustrative implementations, drawings, and techniques illustrated, including the exemplary designs and implementations illustrated and described herein, but may be modified within the scope of the appended claims along with their full scope of equivalents.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented information processing system, comprising:
   a data store having a top tier store and at least another tier store;
   said top tier store including a plurality of entries of symbols, each entry having a counter;
   said another tier store including a representative frequency value defined for said another tier store, the representative frequency value calculated based on frequencies of a plurality of symbols in said another tier store; and
   a sorter configured to sort a symbol in said top tier store and said another tier store according to a value generated in said counter for said assessed symbol;
   said sorter configured to restore entry of said symbol in said top tier store, in response to a symbol having moved from said top tier store to another tier store, by using said representative frequency value defined for said another store to which said symbol was moved.

2. The information processing system according to claim 1, wherein data is divided in a plurality of units each representing a bucket and said buckets are separated by boundaries of predetermined widths.

3. The information processing system according to claim 2, wherein said counter value holds a frequency value of said symbol, and said sorter is configured to restore said frequency value based on a lost past frequency value.

4. The information processing system according to claim 3, wherein said counter value holds a frequency value of said symbol, and said sorter is configured to restore said entry of a symbol on an error value representing an error possibly included in said frequency value; and
   said sorter sets said error value to add an entry in said top tier store; and based on a relationship among said frequency value, said error value, and number of inputted data pieces, said sorter allows an entry to stay in said top tier store or alternatively moved to any one of said tier stores at one of said boundaries between said buckets each having a predetermined width for inputted data pieces.

5. The information processing system according to claim 4, wherein said representative frequency value is an average symbol frequency or a maximum frequency of symbols in said another tier store.

6. The information processing system according to claim 4, wherein there are a plurality of tier stores.

7. The information processing system according to claim 6, wherein said representative frequency value is an average symbol frequency calculated from a total frequency of said symbols and number of the symbols counted for each tier store.

8. The information processing system according to claim 2, wherein there are at least two tier stores; and said sorter incorporates all entries in a higher one of said two tier stores, said higher and lower tier stores being separated by an average symbol frequency of a predetermined value.

9. The information processing system according to claim 2, wherein a plurality of tier stores are provided with at least one tier store having a static tree based on a succinct data structure.

10. The information processing system according to claim 2, wherein a plurality of tier stores are provided with at least one tier store having a dynamic tree based on a link structure.

11. The information processing system according to claim 10, wherein said top tier store is a hash map and a first tier stores is a dynamic tree based on a link structure; and a second tier store is a static tree based on Level Order Unary Degree Sequence (LOUDS).

12. The information processing system according to claim 1, wherein in response to an access to an entry in said top tier store, the sorter increments said counter; and
   in response to an access to a symbol not included in any of said top tier store and said another tier store, said sorter sets an initial value in a counter for an entry of said symbol and newly adds another entry in said top tier store.

13. The information processing system according to claim 1, wherein a relationship exists among a frequency value f, an error value A, and a number of inputted data pieces N for determining an entry to be moved from a top tier store D to another tier store $D_i$; and said relationship is expressed as $$\theta_{i+1}(B-\Delta) < f \leq \theta_i(B-\Delta) \qquad (1)$$

where a bucket width is denoted by 1/e, a bucket identification value is denoted by B (=eN), and threshold factors representing upper limits of frequencies set for the tier stores $D_i$ and $D_{i+1}$ are denoted by $\theta_i$ and $\theta_{i+1}$.

14. A computer implemented data access method having a data store including a top tier store and another tier store, comprising:
   denoting any request for an access to a symbol and counting said requests for access based on frequency of request in said top tier store, said top tier store having a counter for each time an access entry is made to each symbol;
   sorting said symbol into any one of said top tier store and said another tier store according to a value of said counter; and
   in response to an access to a symbol having been moved from said top tier store to another tier store, restoring entry of said symbol in said top tier store by using a representative value defined for the another tier store in which said symbol is stored, the representative value calculated based on values of a plurality of symbols in said another tier store.

15. The data access method according to claim 14, wherein data is divided in a plurality of units each representing a bucket and said buckets are separated by boundaries of predetermined widths.

16. The data access method according to claim 15, wherein said counting of said requests further comprises a sub-step of, in a case where the counter is configured to hold a frequency value of the symbol, setting an error value representing an error possibly included in the frequency value to add an entry in the top tier store;

the sorting step further comprises sub-steps of determining an entry allowed to stay in said top tier store, based on a relationship among the frequency value, the error value, and the number of inputted data pieces, at a boundary between buckets each having a predetermined width for inputted data pieces, and determining an entry to be moved to any one of the tier stores, based on the relationship at the boundary; and the restoring step further comprises a sub-step of setting, in the entry of the symbol, either the frequency value on which a lost past frequency value of the symbol is reflected or an error value according to the representative value.

17. The data access method according to claim 15, wherein said restoring step further comprises a sub-step of calculating an average symbol frequency or a maximum frequency of symbols in each tier store as said representative frequency value.

18. The data access method according to claim 17, wherein a plurality of tier stores are provided and in calculating sub-step in the restoring step, said average symbol frequency is calculated as representative frequency value from a total frequency of said symbols and said number of said symbols counted for each tier store.

19. The data access method according to claim 18, wherein at least two tier stores are provided and said method further comprises the step of, at the boundary between the buckets each having the predetermined width, incorporating all the entries in a higher one of said tier stores, said higher and lower tier stores being separated by an average symbol frequency of a predetermined value.

20. A computer program product for building a data store, the computer program product comprising a non-transitory computer readable storage medium having computer readable program code embodied therewith, said computer readable program code being executable by a computer to:

denote any request for an access to a symbol and counting said requests for access based on frequency of request in a top tier store, said top tier store having a counter for each time an access entry is made to each symbol;

sort said symbol into any one of said top tier store and another tier store according to a value of said counter; and in response to an access to a symbol having been moved from said top tier store to another tier store, restore entry of said symbol in said top tier store by using a representative value defined for the another tier store in which said symbol is stored, the representative value calculated based on values of a plurality of symbols in said another tier store.

* * * * *